(12) United States Patent
Pinal et al.

(10) Patent No.: US 9,772,172 B2
(45) Date of Patent: Sep. 26, 2017

(54) SCALABLE RULES CAPABLE OF CREATING SIZE-ADJUSTABLE CIRCLES, ARCS, AND CURVED SHAPES

(71) Applicant: KOALA TOOLS, LLC, Miami Beach, FL (US)

(72) Inventors: Frank Pinal, Weehawken, NJ (US); Carlos Alberto Rodriguez, Miami Beach, FL (US)

(*) Notice: Subject to any disclaimer, the term of this patent is extended or adjusted under 35 U.S.C. 154(b) by 166 days.

(21) Appl. No.: 14/373,403

(22) PCT Filed: Jan. 18, 2013

(86) PCT No.: PCT/US2013/022018
§ 371 (c)(1),
(2) Date: Jul. 21, 2014

(87) PCT Pub. No.: WO2013/109803
PCT Pub. Date: Jul. 25, 2013

(65) Prior Publication Data
US 2014/0373367 A1    Dec. 25, 2014

Related U.S. Application Data

(60) Provisional application No. 61/588,275, filed on Jan. 19, 2012.

(51) Int. Cl.
| G01B 3/10 | (2006.01) |
| B43L 13/20 | (2006.01) |
| B43L 13/22 | (2006.01) |
| B43L 9/00 | (2006.01) |
| B43L 7/00 | (2006.01) |

(Continued)

(52) U.S. Cl.
CPC ............ *G01B 3/1084* (2013.01); *B43L 7/005* (2013.01); *B43L 9/00* (2013.01); *B43L 11/00* (2013.01); *B43L 13/20* (2013.01); *B43L 13/22* (2013.01); *G01B 1/00* (2013.01); *G01B 3/10* (2013.01); *G01B 3/56* (2013.01); *G01B 2003/1089* (2013.01)

(58) Field of Classification Search
CPC ................... G01B 3/10; G01B 3/1084; G01B 2003/1089; G01B 3/56; G01B 1/00; B43L 7/1005; B43L 7/005; B43L 9/00; B43L 13/20; B43L 13/22; B43L 11/00
USPC ... 33/1 N, 15–16, 501, 514.1, 534, 700, 732
See application file for complete search history.

(56) References Cited

U.S. PATENT DOCUMENTS

| 917,132 A | * | 4/1909 | Pulfrich | .................. G01B 3/56 |
| | | | | 33/1 N |
| 1,146,412 A | * | 7/1915 | Early | ..................... G04B 49/02 |
| | | | | 33/270 |

(Continued)

*Primary Examiner* — R. A. Smith
*Assistant Examiner* — Tania Courson
(74) *Attorney, Agent, or Firm* — Antonio Papageorgiou; Meister Seelig & Fein LLP

(57) ABSTRACT

A tool capable of creating and measuring circles and circular profiles of any size without the need for a pivoting center arm. Circle size can be selectively adjusted and held, and both the inside and outside of tool creates and measures circles of a near infinite number of size. The tool contains marking rules such as radius, diameter, arc length, circumference, sector area, area of a circle for any size circle, etc., obviating the need for calculating the same, and any or a combination of unit measure systems can be employed.

21 Claims, 13 Drawing Sheets

(51) Int. Cl.
  *B43L 11/00* (2006.01)
  *G01B 1/00* (2006.01)
  *G01B 3/56* (2006.01)

(56) References Cited

U.S. PATENT DOCUMENTS

| | | | | |
|---|---|---|---|---|
| 1,299,978 A * | 4/1919 | MacDowney | G01B 3/563 | 33/471 |
| 1,474,394 A * | 11/1923 | Warburg | G01C 17/00 | 33/272 |
| 1,857,523 A * | 5/1932 | Wittel | G03B 21/323 | 206/53 |
| 2,033,604 A * | 3/1936 | Arton | G04B 49/02 | 33/270 |
| 2,097,116 A * | 10/1937 | Dalton | G01C 21/20 | 235/61 S |
| 2,302,210 A * | 11/1942 | Graves | G01C 21/20 | 33/1 SA |
| 2,428,980 A * | 10/1947 | McCann | A61B 5/1135 | 33/514.2 |
| 2,724,895 A * | 11/1955 | Young | G01C 21/02 | 33/1 SA |
| 2,823,857 A * | 2/1958 | Heitor | G06G 1/0052 | 235/61 S |
| 2,934,264 A * | 4/1960 | Miller | G06G 1/0057 | 235/88 R |
| 2,938,270 A * | 5/1960 | Werner | G01C 1/02 | 33/1 N |
| 3,259,311 A * | 7/1966 | Sama | 116/311 | |
| 3,333,343 A * | 8/1967 | Elfast, Jr. | A61B 5/107 | 33/1 SB |
| 3,604,622 A * | 9/1971 | Yamada | G06G 1/12 | 235/116 |
| 3,795,363 A * | 3/1974 | Fabre | G01L 3/00 | 235/78 R |
| 3,822,038 A * | 7/1974 | Olson | G06G 1/12 | 235/78 R |
| 3,903,837 A * | 9/1975 | Barton | G09F 9/00 | 116/315 |
| 4,102,054 A * | 7/1978 | Lewis | G04B 49/02 | 33/1 SC |
| 4,441,258 A * | 4/1984 | McDaniel | G01B 5/025 | 33/203.11 |
| 4,495,709 A * | 1/1985 | Mainenti | B43L 7/007 | 33/484 |
| 4,535,542 A * | 8/1985 | Liu | G01B 3/563 | 33/1 N |
| 4,920,656 A * | 5/1990 | Cross | G01C 17/04 | 33/355 R |
| 5,092,054 A * | 3/1992 | Cipiti | B43L 13/20 | 33/485 |
| 6,105,268 A * | 8/2000 | Vaughn | G01B 3/563 | 33/471 |
| 6,983,887 B2 * | 1/2006 | Holland | G06G 1/08 | 235/475 |
| 8,250,771 B2 * | 8/2012 | Pinal | B43L 7/005 | 33/471 |
| 8,333,016 B1 * | 12/2012 | Keele | G04B 49/02 | 33/270 |

* cited by examiner

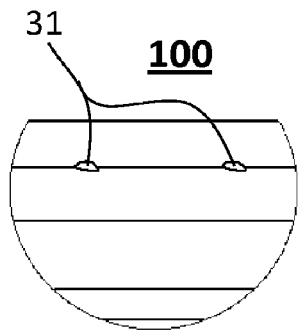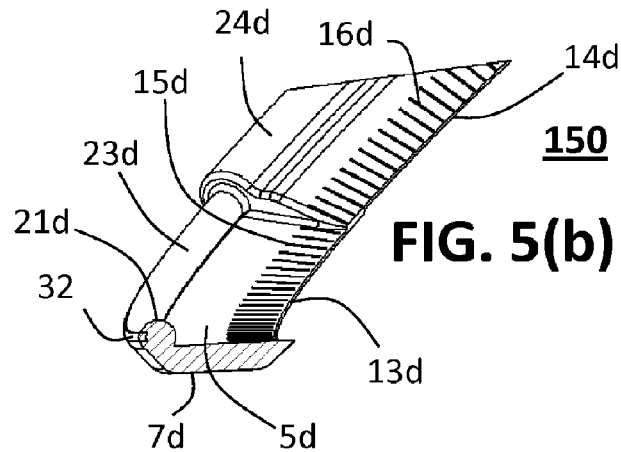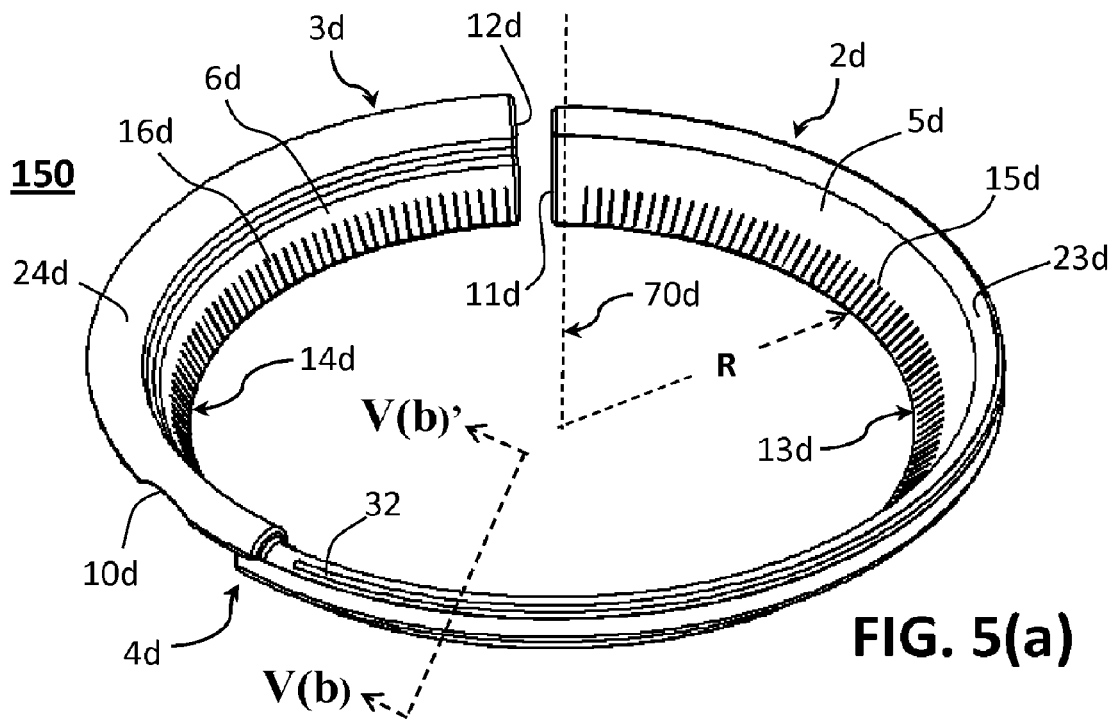

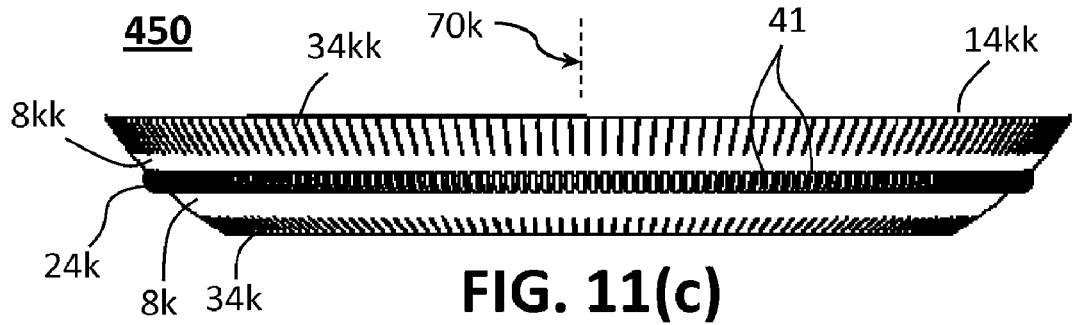
FIG. 11(c)
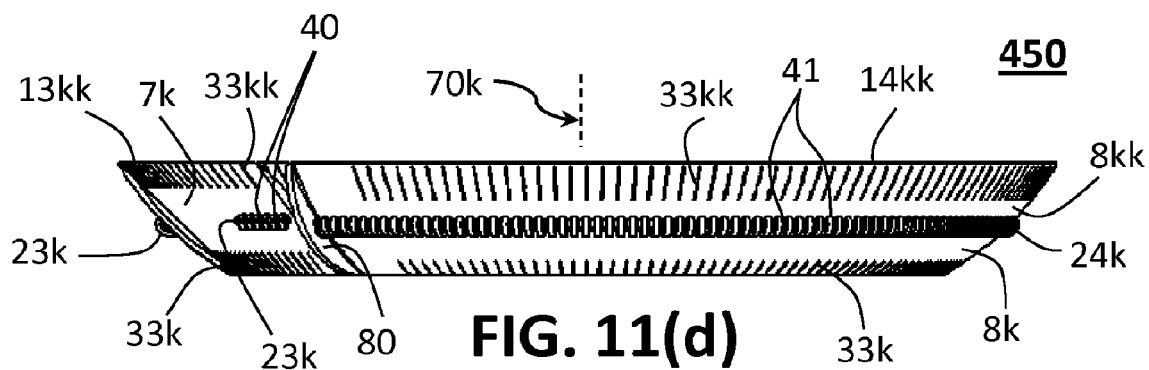
FIG. 11(d)
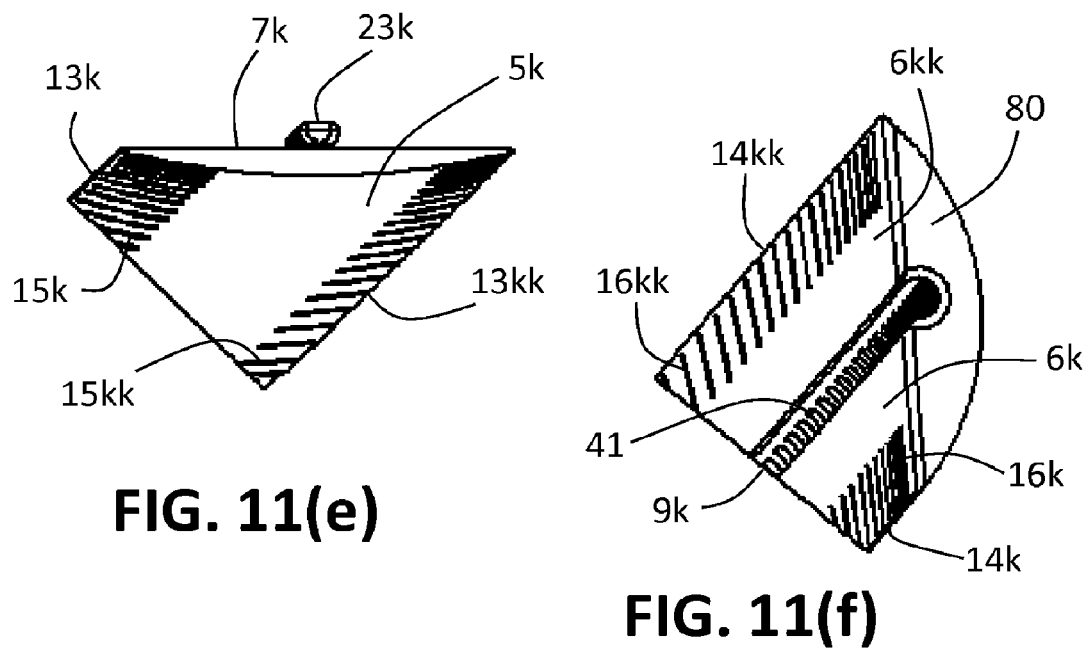
FIG. 11(e)
FIG. 11(f)

SCALABLE RULES CAPABLE OF CREATING SIZE-ADJUSTABLE CIRCLES, ARCS, AND CURVED SHAPES

BACKGROUND OF THE INVENTION

The present application relates to hands-on sketching and measuring tools, rulers, protractors, devices for creating and measuring arcs and circular geometric shapes, and the like.

While many mechanical devices and methods have been proposed for creating circular shapes, the most common of these is the straight-ruler and compass-pencil method, where a straight ruler is first used to set a distance between a center point and a point on the circumference of a circle (a radius), the needle of the compass is placed at the desired center point of a circle, usually on a piece of paper, and finally the point of the compass-attached writing instrument is placed on the same writing medium and used to trace out either an arc or a full circumference by simply rotating the compass and writing instrument about the center point. Another popular method for creating circular arcs is to use arc and circle stencils, where the user can select from pre-determined radii of either single- or multi-shape stencils and trace said circles and arcs with a writing instrument.

Similarly, the most common method for measuring circular arcs is by using a straight measuring ruler or caliper, an electronic straight ruler, and less notably, an arc or circle stencil. With a straight ruler or caliper, the user measures the point to point distance from onside of the circular object or circle, across its center point, to the opposite side—i.e., the diameter. With arc or circle stencils, the user measures an arc or circle by comparing it to the radii of pre-cut shapes, which have pre-determined sizes, and must decide which shape the measured shape is closest to or must interpolate between predetermined sizes.

However, many issues exist with these devices: e.g., for creating a circular shapes. For instance, the human eye has difficulty gauging whether one is measuring the diameter of circle object across the center point of that circular object, often because the object itself is only generally, but not exactly circular, or for instance, how close the radius or diameter of an object or curved line is to a specific size increment or set of size increments of a particular stencil arc. Needless to say, these methods introduce human error and therefore, inaccuracies. Further, some methods for sketching accurately-sized circles not only require more than one tool (a compass and straight ruler), but are also time inefficient and cumbersome. Additionally, the best information that can be attained without having to perform numerous calculations, are the radius and diameter. Information about the arc length or circumference and/or area of a sector or area of the circle at any diameter size are not indicated directly by a rule; they must be calculated, and while these calculations are simple, they can become tedious and cumbersome through repetition.

In short, no single device, hitherto, has either proposed a mechanism for or is capable of creating circles of infinitely adjustable sizes that allows the user to selectively and accurately create, measure, or obtain radius, diameter, arc length, and sector area, either individually or simultaneously.

Accordingly, there is a need for a device that resolves one or more of the aforesaid issues. At least one of the devices disclosed herein indeed does so and does so by introducing a novel and more intuitive mechanism and method for creating and measuring circular profiles and arcs of various sizes.

SUMMARY OF THE INVENTION

A multifunctional scalable, ruler capable of creating size-adjustable circles, arcs, and curved shapes of a near infinite number of sizes and capable of measuring the same. The tool, according to at least the preferred embodiment, comprises a body with at least a male arm, a female arm, and a transition section, wherein the male and female arms are bound together by the said transition zone.

The tool's shape is preferably derived from a solid ring of material, wherein the male arm, female arm, and transition section have either the same or nearly the same bending properties and exhibit the same or nearly the same radii on a congruent edge(s) or surface(s), wherein said edges and radii preferably share a common center point and/or common axis of revolution.

Preferably, the male or female arm, or both, contain(s) at least a mating element(s) that allow the male and female arms to slidably engage each other; thereby allowing the user to create size-adjustable circular shapes. At least one of the said arms, or both, may also contain(s) a feature(s) that (i) effects a non-selective and semi-permanent lock on the tool's arms at any particular size configuration while still allowing the user to adjust the position of the male and female arms, and thereby the size of the radii exhibited on the edges of the tool (e.g., 2 inch, 3.5 inch radius, 4 inch diameter, etc.) or (ii) that allows the user to selectively engage and disengage a lock or locking mechanism at any desirable size configuration.

The tool, preferably, contains rule markings on either the inside surfaces, outside surfaces, or both, that may be in either empirical or metric unit systems, or both, and that preferably indicate particular metrics, e.g., radius, diameter, arc length, circumference, area of sector, area of the circle, etc. These markings may be displayed either alone, in some combination of the above, or all of the above.

BRIEF DESCRIPTION OF THE DRAWING

FIG. 4(b) is a detailed view of the material interference feature shown in FIG. 4(a).

FIG. 5(a) is an isometric view of the tool illustrating a material interference feature on the male arm for semi-permanent locking of the slidable position of the male and female arms when they are slidably engaged to each other.

FIG. 5(b) is a cross-sectional view of the tool shown in FIG. 5(a) taken from the V(b)-V(b)' cutting plane.

FIG. 11(c) is front view of the tool shown in FIG. 11(a) illustrating the female fastening element on the back the female arm with cored-out material sections.

FIG. 11(d) is a back view of the tool shown in 11(a) illustrating the male mating element on the back of the male arm that slidably engages the female mating element on the female arm.

FIG. 11(e) is a cross-sectional view of the male arm of the tool shown in FIG. 11(a) and taken from the XI(e)-XI(e)' cutting plane.

FIG. 11(f) is a cross-sectional view of the profile of the female arm of the tool shown in FIG. 11(a) and taken from the XI(f)-XI(f)' cutting plane.

DETAILED DESCRIPTION OF THE PREFERRED EMBODIMENTS

Figure 1A:
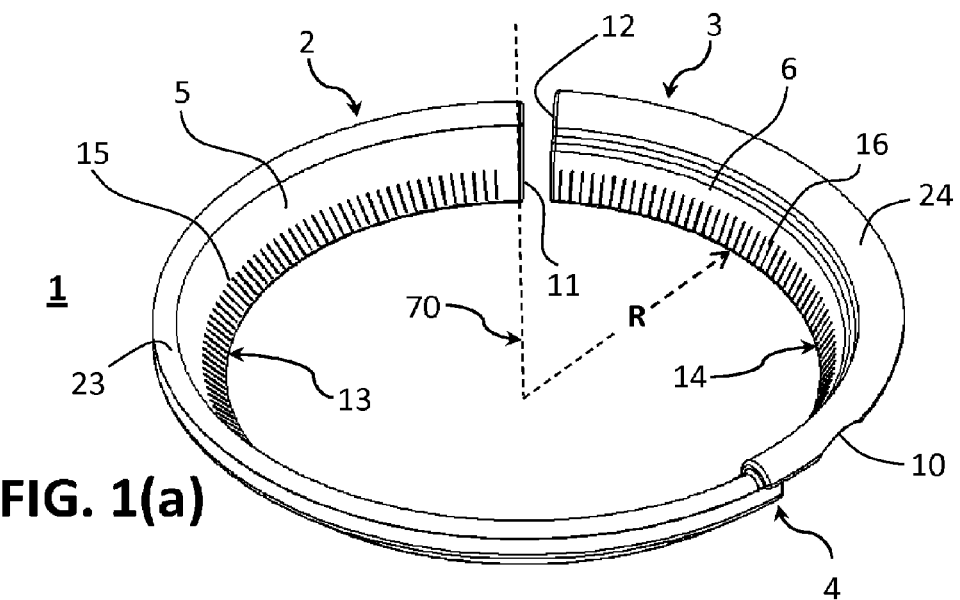
FIG. 1(a) is an isometric view of a preferred embodiment of the invention.
Figure 1B:
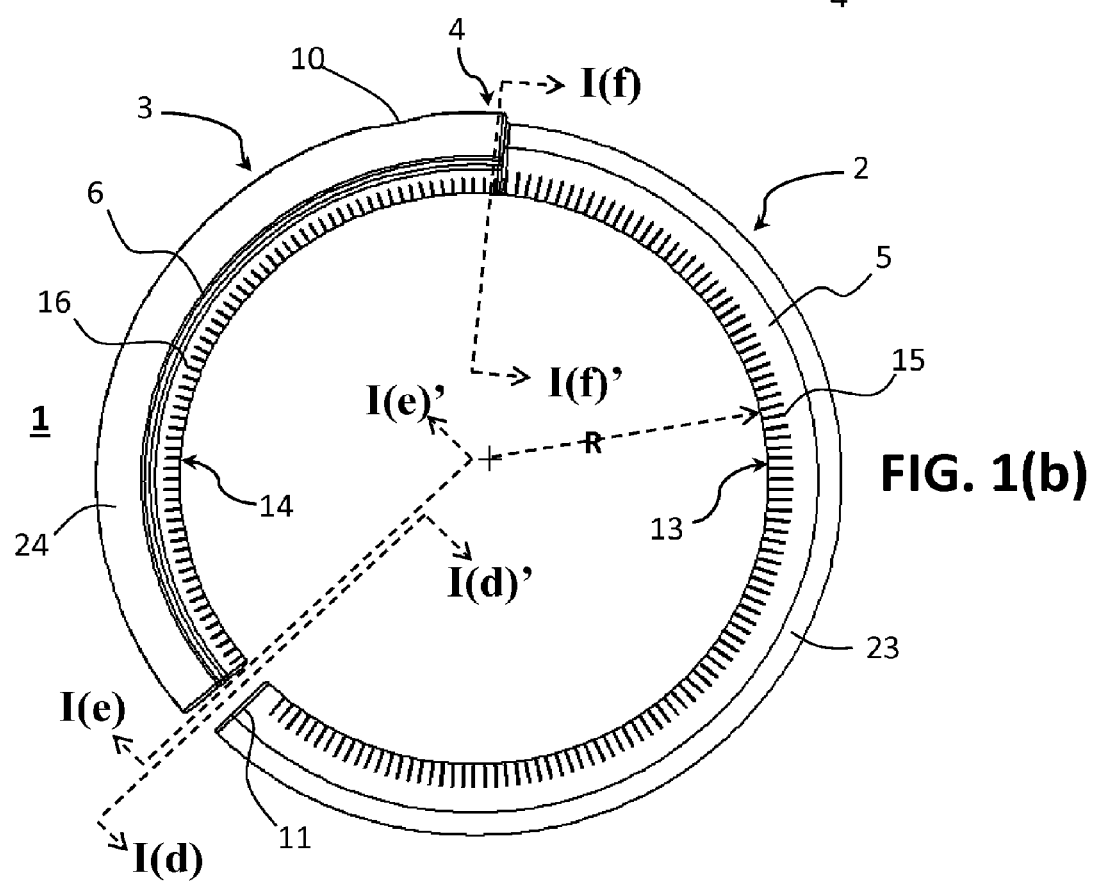
FIG. 1(b) is top view of the tool shown in FIG. 1(a).
Figure 1C:
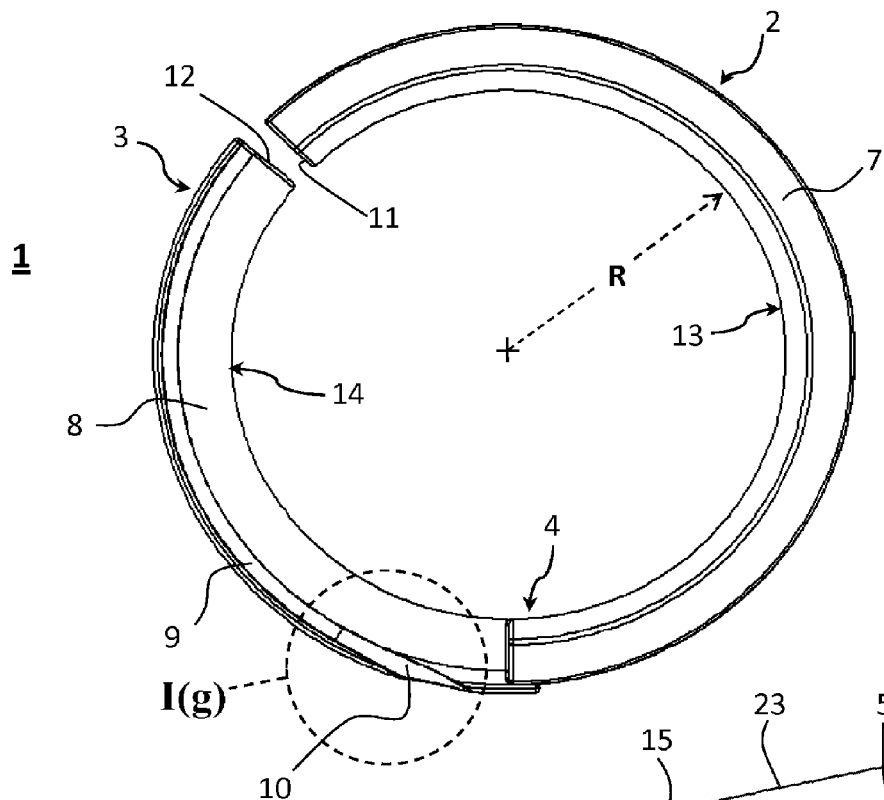
FIG. 1(c) is a bottom view of the tool shown in FIG. 1(a).
Figure 1D:
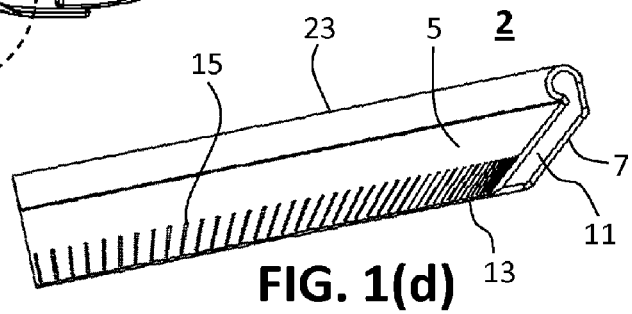
FIG. 1(d) is a cross-sectional view of the male arm of the tool shown in FIG. 1(b) taken from the I(d)-I(d)' cutting plane.
Figure 1E:
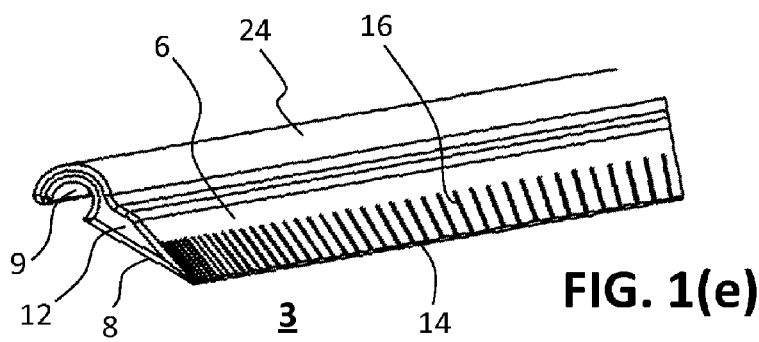
FIG. 1(e) is a cross-sectional view of the female arm of the tool shown in FIG. 1(b) taken from the I(e)-I(e)' cutting plane.
Figure 1F:
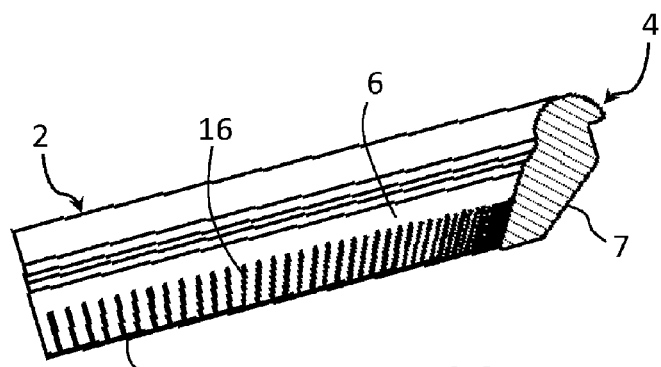
FIG. 1(f) is a cross-sectional view of the transition zone of the tool shown in FIG. 1(b), which lies between the male and female arms of the tool, taken from the 1(f)-1(f)' cutting plane.
Figure 1G:
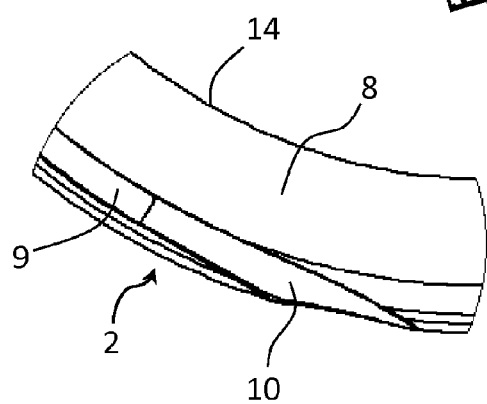
FIG. 1(g) is a detailed view of the tangent guide feature shown in FIG. 1(c).

Generally referring to FIGS. 1-11(f), the tool 1, 1a, 50, 100, 150, 250, 300, 300a, 300a', 350, 400, 450 (hereinafter referred to generally as "1") provided herewith is preferably and generally an open-ended flexible ring of material, or approximately, with a select height, width, and depth, and select cross-sectional profile(s) as described herein, and is preferably an indivisible part, at least for the preferred embodiment, that includes a male arm 2, 2a, 2b, 2c, 2d, 2f, 2g, 2h, 2h', 2i, 2j, 2k (hereinafter referred to generally as "2"), a female arm 3, 3a, 3b, 3c, 3d, 3f, 3g, 3h, 3h', 3i, 3j, 3k (hereinafter referred to generally as "3") and transition section 4, 4a, 4d, 4f, 4g, 4h, 4h', 4i, 4j, 4k.

Referring to FIGS. 1(a)-11(f), the male arm, 2 female arm 3 and transition section 4 each have a select cross-sectional profile, thickness, height, and length or arc length and are preferably located on different sections of the tool 1, wherein each of the arms 2, 3 emanates from the transition section 4 and terminates in a free end 11, 11a, 11d, 11f, 11g, 11h, 11h', 11i, 11j, 11k, 12, 12b, 12d, 12f, 12g, 12h, 12h', 12i, 12j, 12k, (hereinafter referred to as "11" and "12", respectively) and wherein the transition section 4 preferably connects the male arm 2 to the female arm 3, or vice versa and is located between the said male and female arms.

Referring to FIGS. 1-11(f), the cross-sectional profiles of each the male arm 2, female arm 3, and transition section 4 may also be of any shape as long as the shape does not obstruct any of the tool's 1 intended functions as described herein.

Figure 11A:
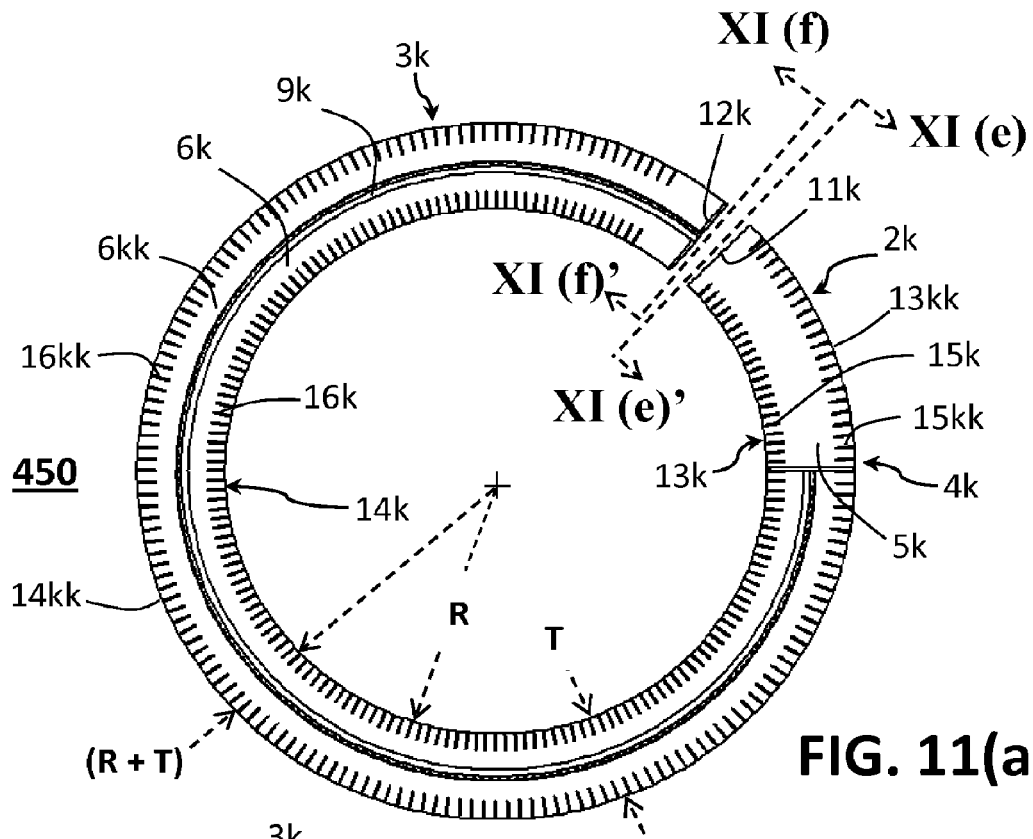
FIG. 11(a) is a top view of the tool illustrating a preferred mode of construction and illustrating that the cross-sections of the male and female arms are nearly symmetrical about a common surface, that both inner and outer surfaces of the tool can comprising rule markings, and that both the inner and outer edges of the tool can be used for creating and measuring circles, arcs, and curved profiles.
Figure 11B:
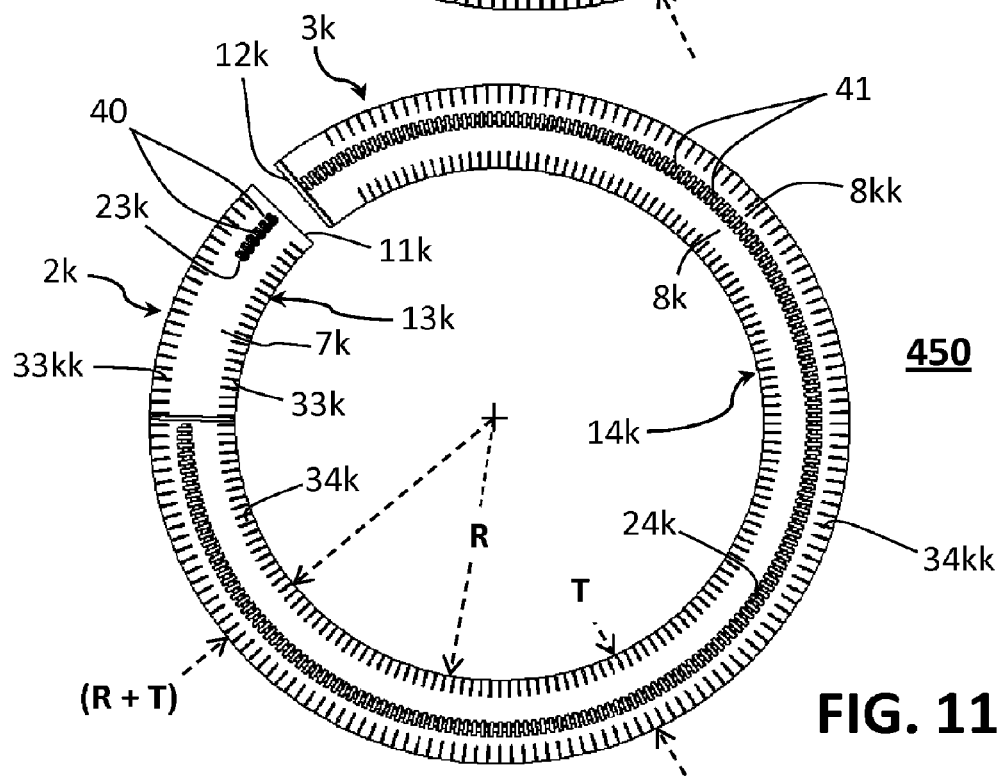
FIG. 11(b) is a bottom view of the tool shown in FIG. 11(a)
Figure 12A:
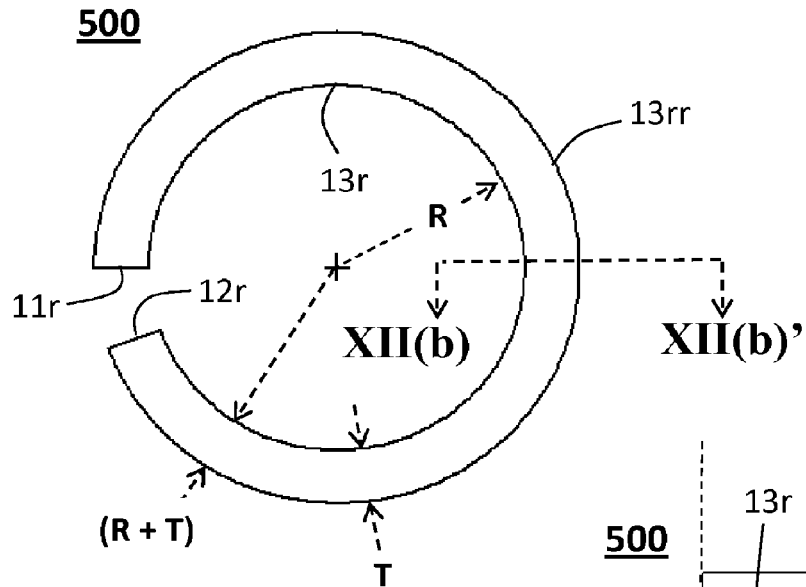
FIG. 12(a) is a top view of an open-ended, ring-like material structure having the same general cross-sectional shape as the tool.
Figure 12B:
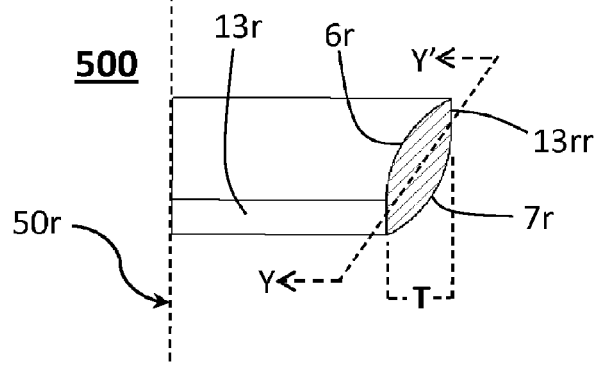
FIG. 12(b) is a cross-section view of FIG. 12(a) taken from the XII(b)-XII(b)' cutting plane.
Figure 12C:
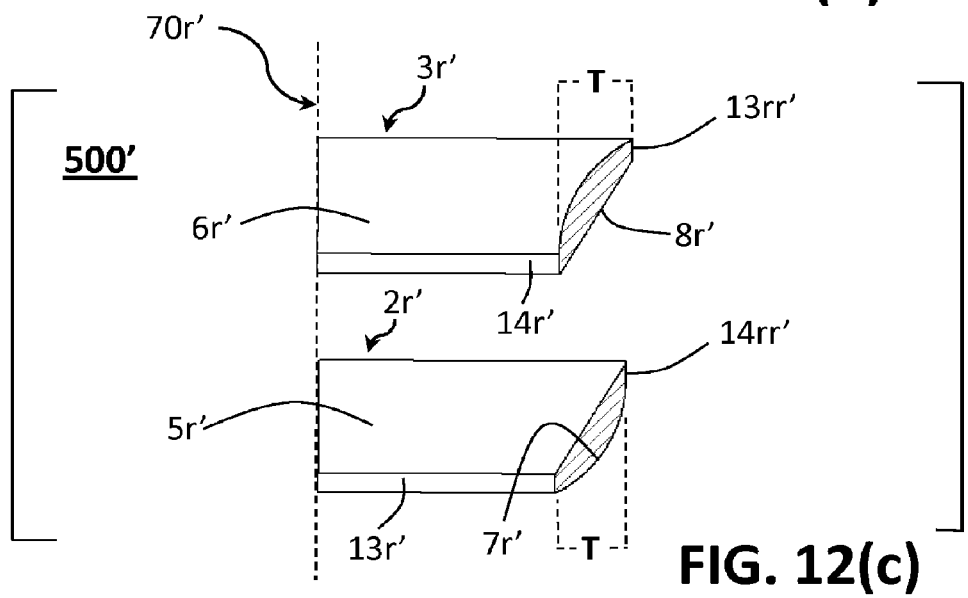
FIG. 12(c) is a front view of the cross-section shown in FIG. 12(b) illustrating the cross-section of the ring-like structure in FIG. 12(a) split along Y-Y' cutting line and the vertically stacked and complementary relationship between the cross-sections of the male and female arms of the tool and that the cross-section of this ring-like material structure has the same general cross-sectional shape as the tool shown in FIGS. 11(a)-11(f).

Referring to FIGS. 1-12(c), for conceptual purposes, the cross-sectional profiles of the arms 2, 3 and the transitions section or zone 4 may be thought of as all being derived from the cross-sectional profile of a hypothetical ring of material 500 (FIG. 12(a)-12(c)) or other general shape including, but not limited to being circular, elliptical, tubular, polygonal, curved, open or closed, regular or irregular, symmetrical or non-symmetrical, amorphous, or any combination thereof—wherein the cross-sectional profiles of the male 2 and female 3 arms are preferably complementary, or approximately complementary, in shape to each other at least along some common mating surface(s) 5 & 8, 5h & 8h, 5h' & 8h', 5j &

8*j*, 5*k* & 8*k*, 5*k* & 8*kk*, 5*r'* & 8*r'* and are non-overlapping or can be construed as being derived from different sections or portions of different sections within the cross-section of this hypothetical ring of material 500 (FIGS. 12(*a*)-12(*c*)).

Referring to FIGS. 1(*a*)-11(*f*), it is preferred that the cross-sectional profile of the transition section 4 encompass the cross-sectional profiles of the male 2 and female 3 arms of the tool 1, and that it can be either equal, approximately equal, or neither, to the cross-sectional profiles of that of the male and female arms together. And the cross-sectional profile of the transition section 4 may also either be constant or variable and may comprise a gradient in either thickness or shape gradient, or both, along the length or sweep of the tool 1 that is located between the male 2 and female 3 arms of the tool 1.

Alternatively, referring to FIGS. 1(*a*)-11(*f*), the transitions section 4 in general need not follow the sweep of the tool 1—the path that the tool's 1 cross-sections follow as they create the tool's 1 general shape—or conform to the shape of either of the male arm 2 or female arm 3, or both, and can be or follow or conform to any shape as long as the shape does not obstruct any of the tool's 1 functions as described herein; e.g., the transitions section 4 may follow a straight line or approximately straight line or curve that allows the center axis of each arm to be separated by a certain distance, and thereby allowing for the creation of ellipses.

Referring to FIGS. 1(*a*)-12(*c*), among the principal features that makes the tool useful is that (as explained in the next several paragraphs) the male and female arms 2, 3 preferably have coincident, equal-curvature surfaces or edges 13 & 14, 13*a* & 14*a*, 13*d* & 14*d*, 13*f* & 14*f*, 13*g* & 14*g*, 13*h* & 14*h*, 13*h'* & 14*h'*, 13*i* & 14*i'*, 13*j* & 14*j*, 13*j* & 14*j*, 14*k* & 14*k*, 13*r'* & 14*r'*, and 13*rr'* & 14*rr'*, (hereinafter referred to generally as 13 &14, respectively) or do so approximately, or by some amount of clearance either due to intended engineering design deviations and/or to manufacturing limitations and/or defects, insofar as said arms share a common virtual surface 13*r*, 13*rr* (FIG. 12(*a*)-12(*b*)) comprising the paired surfaces or edges 13 & 14.

Referring to FIGS. 1(*a*)-12(*c*), said coincident, equal-curvature surface(s) or edge(s) 13 & 14, may for conceptual purposes be created by a hypothetical line and/or curve Y-Y (FIG. 12(*b*)) that preferably splits the cross-sectional profile of a hypothetical ring of material 500 into two cross-sections or parts 2*r'*, 3*r'*, wherein one of the parts 2*r'*, 3*r'* can be construed as having a cross-sectional profile equivalent, or approximately equivalent, to that of the male arm 2 of the tool 1 and other part as having a cross-sectional profile equivalent, or approximately equivalent, to that of the female 3, assuming that both the male and female arms 2, 3 are without mating elements, modifications, core-outs, removed or added material sections, markings, and/or any other features as described herein.

Referring to FIGS. 1(*a*)-12(*c*), said hypothetical line or curve Y-Y (FIG. 12(*b*)) preferably splits the cross-section (FIG. 12(*c*)) of said hypothetical ring 500 along the inside and/or outside virtual surface(s) or edge(s) 13*r*, 13*rr* of the ring 500, and splits each virtual surface(s) or edge(s) 13*r*, 13*rr* into two surfaces or edges 13 & 14—which relevantly allows the arms to vertically stack on each other (coaxially) while being co-radial along it edges 13 & 14, making the tool 1 particularly useful for creating circles, or other shapes as described herein, and as a measurement rule. This is different than a zip tie or other tie in that it solves the problem of material spirally looping on itself and obstructing both the front and back edge of what would otherwise be a theoretically perfect or near perfect circle, assuming all else was optimally designed for the same intended purpose.

Referring to FIGS. 1(*a*)-12(*c*), the surfaces or edges 13, 13*a*, 13*d*, 13*f*, 13*g*, 13*h*, 13*h'*, 13*i*, 13*j*, 13*k*, 13*kk*, 13*r*, 13*rr*, 13*r'*, & 13*rr'* (hereinafter referred to generally as "13") are preferably, but necessarily, shared by the male arm 2 and the transitions section 4, and the surfaces or edges 14, 14*a*, 14*d*, 14*f*, 14*g*, 14*h*, 14*i*, 14*j*, 14*k*, 14*kk*, 14*r'*, & 14*rr'* (hereinafter referred to generally as "14") are preferably shared by female arm 3 and the transitions section 4.

Referring to FIGS. 1(*a*)-12(*c*), the surfaces or edges 13 and 14 are preferably exactly or approximately co-radial (concentric and having an equal radius) with the radius R (FIGS. 1(*a*)-12(*c*)); the surfaces or edges 13*kk* & 14*kk* (FIGS. 11(*a*)-11(*f*)), preferably, are exactly or approximately co-radial with radius (R+T), the radius representing the sum of the length of the radius R and the cross-sectional thickness T; the surface(s) or edge(s) 13*h'* & 14*h'* (FIGS. 8(*c*)-8(*e*)) preferably are exactly or approximately co-radial with radius R', as later described herein; and it is implied here that the edges 13*kk* & 14*kk* (FIGS. 11(*a*)-11(*f*)), when the male and female arms 2, 3 are slidably engaged, preferably, are exactly or approximately co-radial with the radius (R+T)'.

Referring to FIGS. 1(*a*)-11(*f*), the radii R, R', and (R+T), and the implied radius (R+T)', as referenced herein, all emanate from the center axis 70, 70*a*, 70*b*, 70*c*, 70*d*, 70*h*, 70*j*, 70*k* (hereinafter referred to generally as "70") of the tool 1 and are all perpendicular to the center axis of the tool, or equivalently, all emanate from the center point of the plane corresponding to the edges 13 and 14, respectively. Additionally, said radii R, R', (R+T), (R+T)' can be of any value or length, practically, since the tool's size and thus, these radii R, R', (R+T), (R+T)' can be adjusted within a working range of sizes (e.g., scalable radii or circles from 2" to 10", from 1" to 30", from 10" to 15", etc.), which are to specified by the tool's actual production design(s).

Alternatively, and referring to FIGS. 1(*a*)-11(*f*), if the tool 1 is constructed for creating or measuring concentric poly-radius curves or polycentric single- or poly-radius curves (e.g., 2$^{nd}$ order polynomial curves, 3$^{rd}$ order polynomial curves, 2d spirals, 3D spirals, bent curves, mixed, etc.), the surfaces or edges 13 and 14 are preferably designed to exactly or approximately follow such a curve rather than a radius R; similarly, surfaces or edges 13*kk* & 14*kk* (FIGS. 11(*a*)-11(*f*)) may exactly or approximately follow such a curve rather than the radius (R+T); similarly, the surface(s) or edge(s) 13*h'* & 14*h'* (FIGS. 8(*c*)-8(*e*)) may exactly or approximately follow such a curve rather than the radius R', as described herein; and similarly, the edges 13*kk* & 14*kk* (FIGS. 11(*a*)-11(*f*)), when the male and female arms 2, 3 are slidably engaged, may exactly or approximately follow such a curve rather than the radius (R+T)'

Further and similarly, referring to FIGS. 1(*a*)-11(*f*), the tool's overall shape 1 and that of the individual sections 2, 3, 4 may conform to the shape of any of said concentric poly-radius curves or polycentric single- or poly-radius curves. Further, it is implied here, in the alternative case, that the inner and outer surfaces or edges 13, 14 of the said arms and transitions section need not be coaxial with the center axis R, or either concentric or co-radial with each other.

Referring to FIGS. 1(*a*)-11(*f*), the tool's 1 thickness and cross-sections of each section 2, 3, 4 may also be uniform, constant, stepped, wave-like, variable along length or arc length or sweep, etc., of section 2, 3, 4, for whatever reason, though preferably to accommodate intended cross-sectional features, modifications, mating elements, cored-out material sections, etc., as described herein. However, it is preferred that the thickness and cross-sectional shape of each of the tool's cross-sections 2, 3, 4 along the tool's circular sweep (i) be consistent, or approximately consistent, so that the bending properties of each section 2, 3, 4 about the center axis 70 can be consistent within each section and (ii) be of a respective, select thicknesses and cross-sectional shape so that the bending properties of each section 2, 3, 4 be consistent, or approximately consistent, between sections 2, 3, 4.

Further and similarly, referring to FIGS. 1(*a*)-11(*f*), when both the inside and outside surfaces or edges 13, 14 of the tool 1 are intended to be used as circular or curved rulers, it is preferred the tool's 1 cross-sectional thickness T be as uniform as possible (FIG. 11(*a*)-12(*c*)), where T can be of any magnitude, but preferably a useful increment or fraction of length, e.g., 1 inch, 2 inches, $1/16^{th}$ inch, or 2 cm, 2.54 cm, 5 cm, etc.

Referring to FIGS. 1(*a*)-11(*f*), the length or arc length of each the male 2 and female arms 3 of the tool 1 may also be of either the same or various different lengths, but it is preferred that if the tool employs a tangent-guide feature(s) 10, 10*a*, 10*d*, 36, 38 (hereinafter referred to as "10") (FIGS. 1(*a*)-2, 5(*a*), & 6-7) or an equivalent design feature(s) 24*h* & 40, 24*h*' &40', 24*i* & 40*a*, 24*j* & 40*b*, 23*k* (hereinafter referred to as "24*h* & 40") (FIGS. 8(*a*)-11(*f*)), as later described herein, that the arm 2, 3*k* following or intended to follow a tangent path when the said male and female arms 2, 3 are slidably engaged—be longer than the other arm 3, 2*k*, since increasing the length of this particular arm 2, 3*k* increases the range of radius R', (R+T)' sizes that can be created by scaling the tool 1 (FIGS. 8(*c*)-8(*e*)).

Additionally, referring to FIGS. 1(*a*)-11(*f*), the cross-sectional profiles of the male arm 2, female arm 3, and transition section 4 of the tool 1 can be further modified as appropriate for functional engineering and manufacturability purposes, e.g., mating elements, features, cored-out sections, cutouts, etc., as described herein.

Referring to FIGS. 1(*a*)-11(*f*), material may also be added to or removed from each arm 2, 3 and/or the transitions section 4 for purpose of enhancing or decreasing the flexibility or stiffness of either (i) the entire tool 1 itself (refer to FIG. 12(*a*)-12(*d*)) or of the arms 2, 3 and/or transition section 4 independently of each other. Such changes can increase or decrease the force required to bend each of the material sections 2, 3, 4 as intended and described herein- or equivalently, the force required to change the scale of the inner radius R, R' and outer radius (R+T), (R+T)' along of the inner surfaces or edges 13, 14 and outer surfaces or edges 13*kk*, 14*kk*, respectively, by a certain amount.

Figure 9:
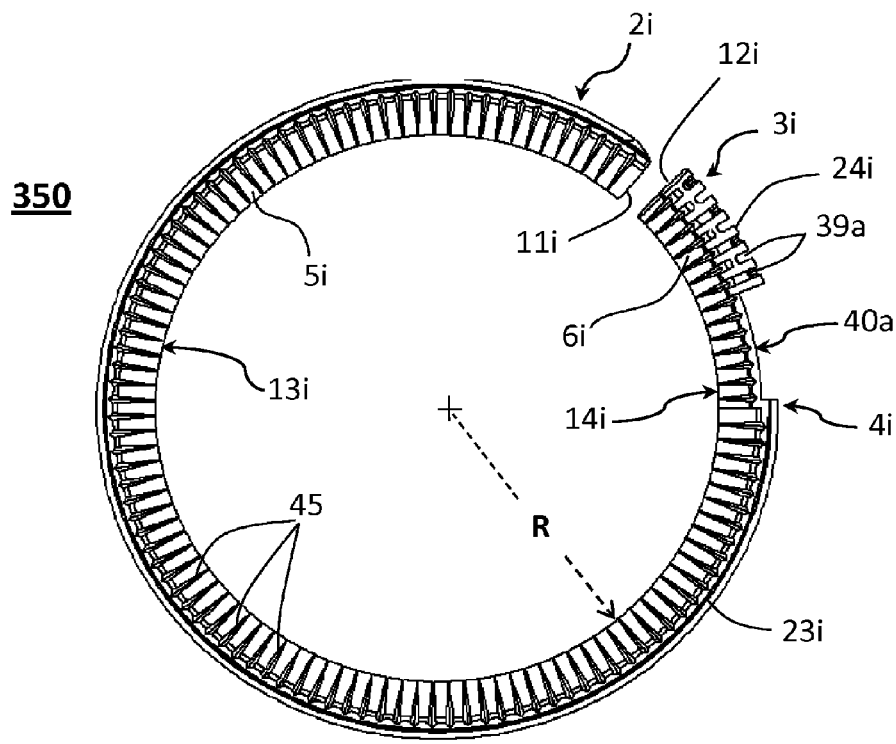
FIG. 9 is a top view of the tool illustrating a circular pattern of cut-out partial-pyramidal or partial—diamond profiles—initiating along the inner surface of the arms and/or transition section and terminating inside the cross-section of the arms and/or transition section—for facilitating bending of the tool.
Figure 10A:
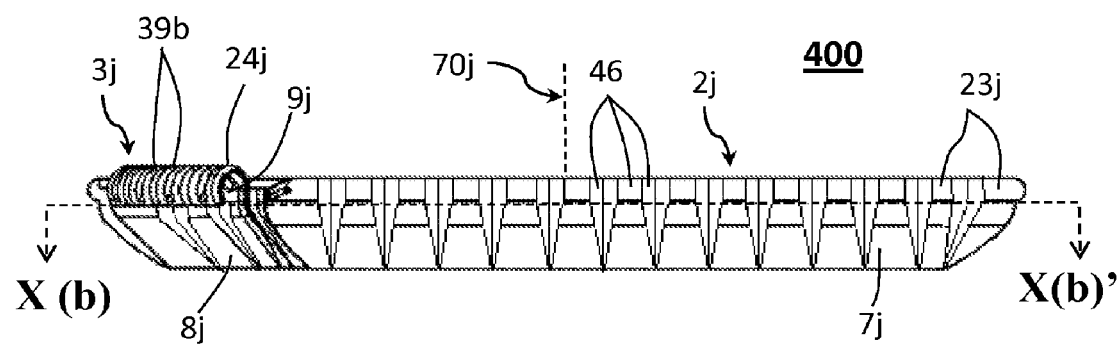
FIG. 10(a) is a side view of the tool illustrating a circular pattern of cut-out partial-pyramidal or partial—diamond profiles—initiating along the inner and outer surfaces of the arms and/or transition section and terminating inside the cross-section of the arms and/or transition section—for facilitating bending of the tool.
Figure 10B:
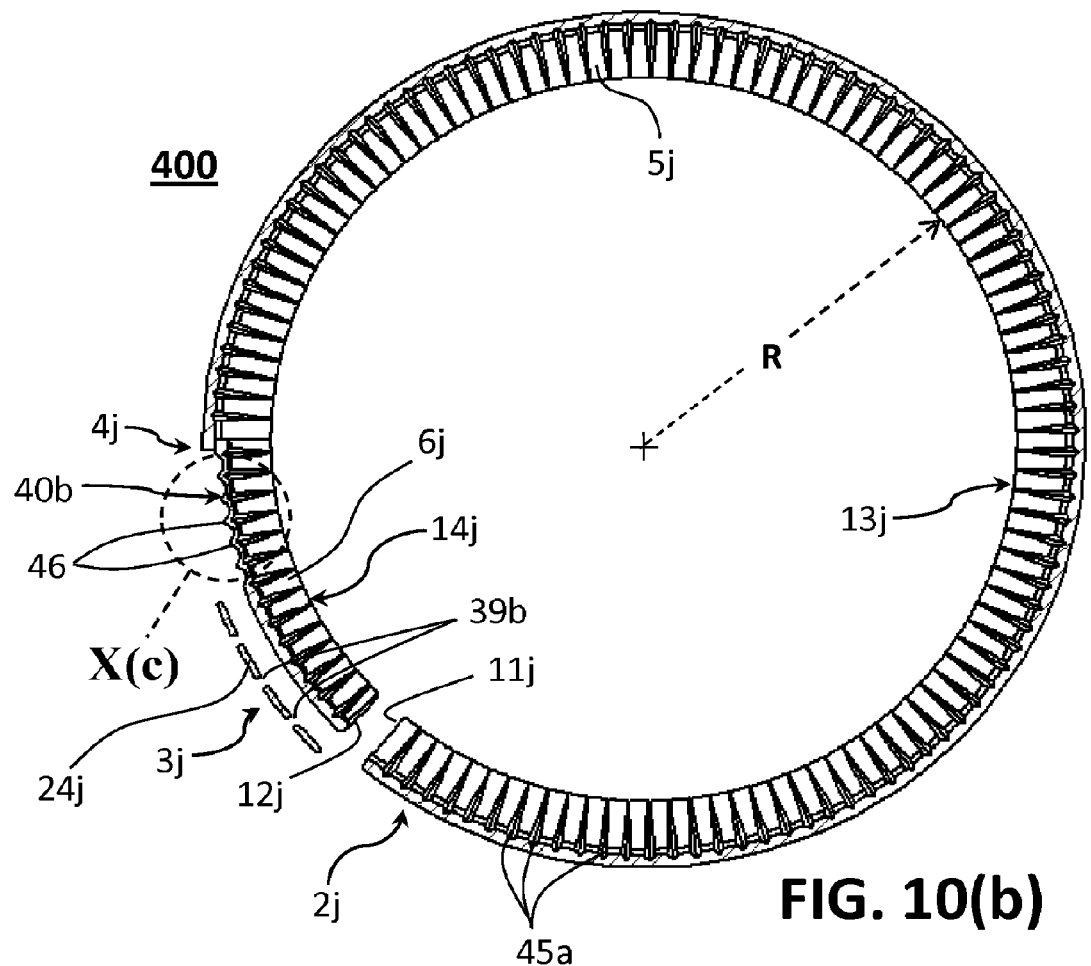
FIG. 10(b) is a cross-sectional view of the tool shown in FIG. 10(a) taken from the X(b)-X(b)' cutting plane.
Figure 10C:
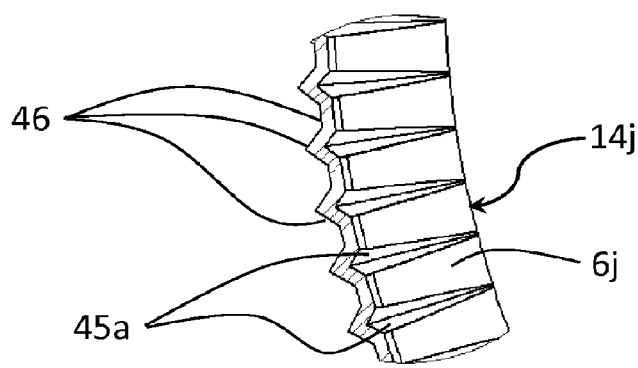
FIG. 10(c) is a detailed view of the tool shown in FIG. 10(b), illustrating a circular pattern of cut-out triangular profiles along the inner and outer surfaces of the tool.

For example, referring to FIGS. 9-10(*c*), the tool 350, 400 has removed material sections 45, 45*a*, 46 in the half-pyramids or partial diamond sections. Additionally, these cored-out or removed sections 45, 45*a*, 46, are simply meant to be illustrative rather than exhaustive as it is intuitive that they may be of any shape and/or patterned configuration or distribution on the tool 1 (FIGS. 1(*a*)-11(*f*)), as long as they are in accord with and/or and do not obstruct any of the tools said functions as described herein.

Alternatively, referring to FIGS. 1(*a*)-11(*f*), removing or adding material from the cross-sectional profile(s) of any individual material sections 2, 3, 4 and/or features 23, 23*a*, 23*b*, 23*c*, 23*d*, 23*f*, 23*g*, 23*h*, 23*h*', 23*i*, 23*j*, 23*k*, 24, 24*a*, 24*b*, 24*c*, 24*d*, 24*f*, 24*g*, 24*h*, 24*h*', 24*i*, 24*j*, 24*k* (hereinafter referred to as "23" and "24", respectively) or any combination of said material sections and features—allows said material sections 2, 3, 4 to, by design—to potentially create arcs, circles, and/or polycentric and/or poly-radii arcs or curves independently of the other said material sections; this allows the tool 1 to be used for measuring all or portions of the said types of curves, as well as more complex ones.

For example, referring to FIGS. 1(*a*)-11(*f*), one arm 2, 3 may be substantially stiffer than the other (e.g., due to having less material removed, more material, different material, purposeful design, etc.), effectively making it a rigid edge and the other a flexible edge, allowing the more flexible arm 2, 3 to create curves or shapes against a straight, or approximately straight, edge, or one arm 2, 3 may be of a lesser but similar stiffness than another arm 2, 3 allowing for the creation of more subtle non-circular shapes and/or curves.

Additionally, referring to FIGS. 1(*a*)-11(*f*), it is implied that if the arms 2, 3 and transition section 4 are designed such that differences in flexibility or stiffness are implemented relative to each other, that the respective inner edges 13, 14 of each section 2, 3, 4 and where applicable, the respective outer edges 13*kk*, 14*kk* (FIGS. 11(*a*)-11(*f*)—may or may not be tangent to each other depending on the intended application and may be subject to some other geometrical condition, such as being angled to each other, for example.

However, referring to FIGS. 1(*a*)-11(*f*), it is preferred, at least in the first embodiment of tool 1 that the bending profiles of these sections 2, 3, 4 be the same, approximately the same, or similar, since the tool is principally concerned with measuring and creating circles and mono-centric and single-radius arcs.

Additionally, referring to FIGS. 1(*a*)-11(*f*), the features or elements 23, 24 of male 2 and female 3 arms of the tool 1 may optionally contain cored-out material sections 36, 37, 39, 39', 39*a*, 39*b*, 40, 41 (FIGS. 6-11(*f*)) that improve manufacturability and/or increase or decrease the force or stress required to bend, strain, or effect a particular trajectory of the male 2 or female 3 arms of the tool 1, especially where said features or elements 23, 24 are located.

Additionally, referring to FIGS. 1(*a*)-11(*f*), these cored-out material sections 36, 37, 39, 39', 39*a*, 39*b*, 40, 41 (FIGS. 6-11(*f*)) may be patterned or distributed in any manner about the tool 1 or its arms 2, 3 as long as the pattern of distribution does not obstruct any of the tool's 1 intended functions as described herein. Further, the cored-out material sections 36, 37, 39, 39', 39*a*, 39*b*, 40, 41 can also be of any shape as long as the shape does not obstruct any of the tool's 1 intended functions as described herein; however, it is preferred that the shape and pattern of distribution be as uniform as possible in order for all of the sections 2, 3, 4 of the tool 1 to exhibit consistent bending properties and/or bending profiles.

Generally referring to FIGS. 1(*a*)-11(*f*), the major distinction between the male 2 and female 3 arms of the tool 1 is that the female arm comprises at least a feature(s) or element(s) 24 that is capable of receiving and slidably engaging the male arm or at least some feature(s) or elements(s) 23 of the male arm—and the male arm comprises at least a feature(s) or element(s) 23 that is capable of being inserted into and slidably engaging the female arm 3 or at least some feature(s) or element(s) 24 of the female arm.

Referring to FIGS. 1(*a*)-11(*f*), each the male 2 and female 3*a*, 3*b*, 3*c*, 3*d*, 3*f*, 3*g*, 3*h*, 3*h*', 3*i*, 3*j*, 3*k* (hereinafter referred to as "3*a*") arms preferably comprise complementary mating elements or fastening features 23 & 24, or a plurality of such features or elements, or alternatively, just one of the said arms 2, 3*a* may comprise a mating elements or fastening features, or a plurality of the same, that allows the male and female arms 2, 3*a* to selectively engage or secure each other such that they are able to slide relative to each other while maintaining a closed loop configuration 60*h*' (FIG. 8(*c*)-8(*e*)), as later described herein.

In general, referring to FIGS. 1(*a*)-11(*f*), these mating elements or features 23, 24 may be of any kind or shape, as long as they allow the male 2 and female 3*a* arms to slidably engage each other as intended and do not obstruct any the tool's 1 intended functions as described herein, and may include, but are not limited to the following mechanical features and/or mechanisms: cam profiles, ribs, pins, shafts, tubes, snap hooks, slots, other male mating elements and female mating elements, extrusions, flanges, sweeps, or cuts, grooves, etc., and various other features and mechanisms, and/or any combinations thereof.

Referring to FIGS. 1(*a*)-11(*f*), the mating elements 23, 24, as shown in the preferred embodiment are complementary in shape or nearly and as such facilitate sliding such that the male mating element or feature 23 on the male arm 2 is able to slide or move unimpeded, or slightly impeded, along the inside wall 9, 9*b*, 9*c*, 9*d*, 9*j*, 9*k* of the female mating element or feature 24 on the female arm 3*a*, or vice versa, and an intended material interference created by overhanging material on the female mating element 24, captures or secures the male mating element 23 within the inside wall or profile 9, 9*b*, 9*c*, 9*d*, 9*j*, 9*k* of the female mating element 24—while still allowing for unimpeded, or slightly impeded, sliding between the male 2 and female 3 arms when the tool 1 is used as described herein.

As stated previously, referring to FIGS. 1(*a*)-11(*f*), it is preferred that the male arm 2, female arm 3, and the transition section 4 all have exactly or approximately the same radius R, R', (R+T), (R+T)' on the inside edge and when applicable, the outside edge 13*kk*, 14*kk* of the tool 1; however, it is also preferred that when the said male and female arms 2, 3 of the tool 1 are slidably engaged to each other and are configured in a loop 60*h*' (FIGS. 8(*c*)-8(*e*)), as described below, that the said arms 2, 3 be spatially oriented such that either the male arm 2 is vertically stacked or lies on top of the female arm 3*a*, or vice versa.

Referring to FIGS. 1(*a*)-11(*f*), a closed ring or loop 60*h*' of material is created when the male 2 and female 3 arms are slidably engaged, as described herein and as referred to in FIG. 11(*e*)-11(*f*). This loop or closed ring 60*h*' is preferably, but not necessarily the only functional portion of the tool 1. However, material belonging to either the male 2 or female 3 arms following a trajectory or path tangent to the said loop of material 60*h*', which is a consequence of creating sufficiently small radii with the tool 1 in concert with the tangent-guide feature(s) 10 (FIGS. 1(*a*)-1(*c*), 2, 5(*a*), 6, & 7) or an equivalent design feature(s) 24*h* &40 (FIGS. 8(*a*)-11(*e*)) performing their intended functions—does not need to conform with the shape (e.g., radii, curves, etc.) of the inner and outer edges or surfaces 13, 14 of the tool 1 that are part of the said material loop 60*h*'.

The tangent-guide feature(s) 10 (FIGS. 1(*a*)-1(*c*), 2, 5(*a*), 6, & 7) or an equivalent design feature(s) 24*h* &40 (FIGS. 8(*a*)-11(*e*)) as illustrated in FIGS. 1(*a*)-11(*f*) is optional, but it is also preferred that said feature(s) intentionally divert material following from either the male 2 or female 3 arm's free ends 11, 12 away from the material loop 60*h*' (as shown in FIGS. 8(*c*)-8(*e*))—or alternatively, towards the center of the material loop 60*h*' or circle—and preferably on a path tangent to the loop 60*h*'. This feature(s) effectively increasing the scalable size range of the tool 1.

Further, referring to FIGS. 1(*a*)-11(*f*), said feature(s) 10, 24*h* & 40 (FIGS. 1(*a*)-1(*c*), 2, 5(*a*), & 6-11(*e*)) may located on either arm 2, 3, or both, and can be of any shape or sort as long as they don't obstruct the tool's 1 intended functions as described herein. Without this feature(s) 10, 24*h* & 40, the tool 1 would at best be scalable to ½ of its maximum radius, e.g., from 10 inches to 5 inches, or from 8 inches to 4 inches, etc., instead of to a much smaller fraction of the maximum radius, e.g., from 10 inches to 2 inches, 6 inches to 1 inch, etc. Further, the said features 10, 24*h* & 40, as shown in FIGS. 1(*a*)-11(*f*), are simply meant to be illustrative rather than exhaustive, as it is intuitive that the function of this feature(s) 10, 24*h* & 40 can be achieve in an innumerable number of ways.

Referring to FIGS. 1(*a*)-11(*f*), the tool 1 may optionally contain a feature or secured part such as a tab or finger grip 80 (FIGS. 11(*a*)-11(*f*)) on one of its arms 2, 3 that may facilitate handling of the tool's 1 the arms 2, 3, especially when the relative positions of the arms 2, 3 are to be adjusted during the tools use—i.e., when the male and female arms 2, 3 are slidably engaged to each other. Further, this feature is preferably, but not necessarily, located at or near the ends 11, 12 of the said arms, and may be of any shape or size, width, length, height, etc., as long as its dimensions or shape do not obstruct or substantially obstruct the tool's 1 intended functions as described herein. Additionally, this feature or part may be designed exclusively to or may have accessory-parts attachment features for facilitate selective fixing the tool 1 onto a drafting table, a wall, surface any sort, or some fixture, or all of the above, or any combination of the above.

Figure 2:
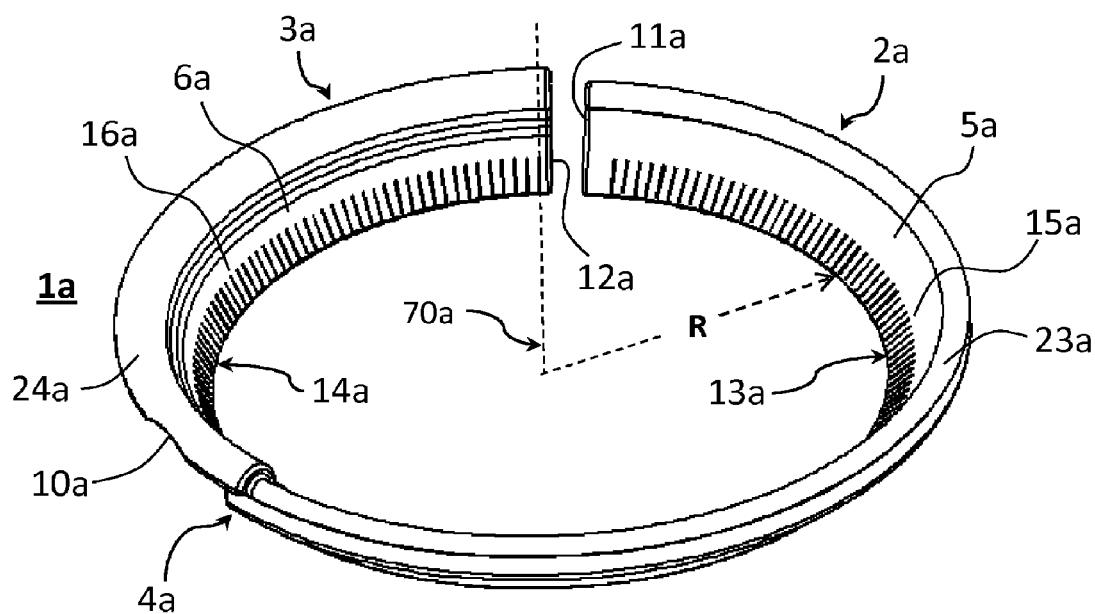
FIG. 2 is an isometric view of the tool illustrating that the position of the male and female arms of the tool may be oriented in a counter-clockwise orientation with respect to each other from an aerial view point when looking at the top of the tool.
Figure 3A:
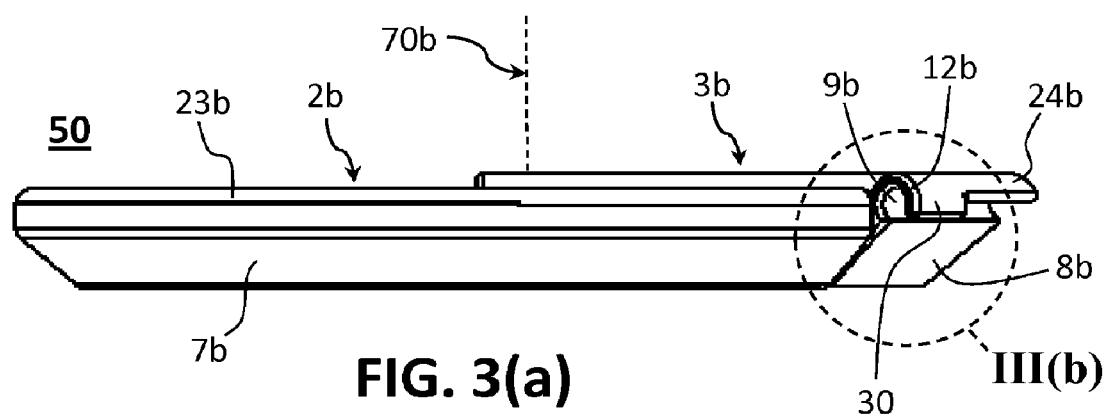
FIG. 3(a) is a side view of the tool illustrating the addition of a material interference feature on the female arm for semi-permanent locking of the slidable position of the male and female arms when they are slidably engaged to each other.
Figure 3B:
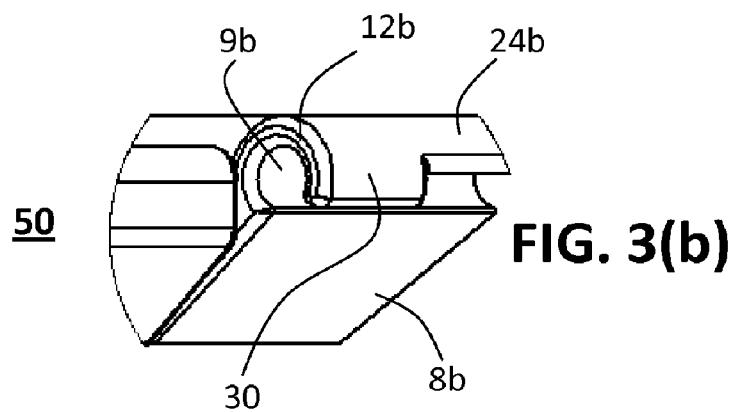
FIG. 3(b) is a detailed of the material interference feature shown in FIG. 3(a).
Figure 4A:
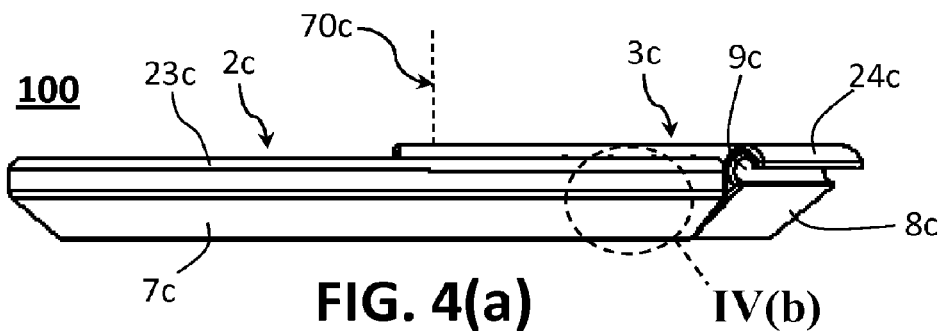
FIG. 4(a) is a side view of the tool illustrating a material interference feature on the male arm for semi-permanent locking of the slidable position of the male and female arms when they are slidably engaged to each other.
Figure 6:
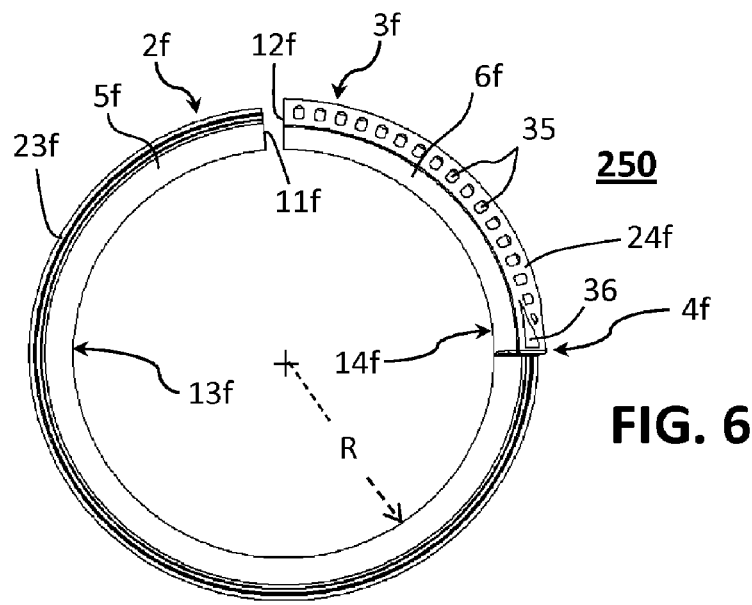
FIG. 6 is a top view of the tool illustrating cored-out material sections on the mating element of the female arm.
Figure 7:
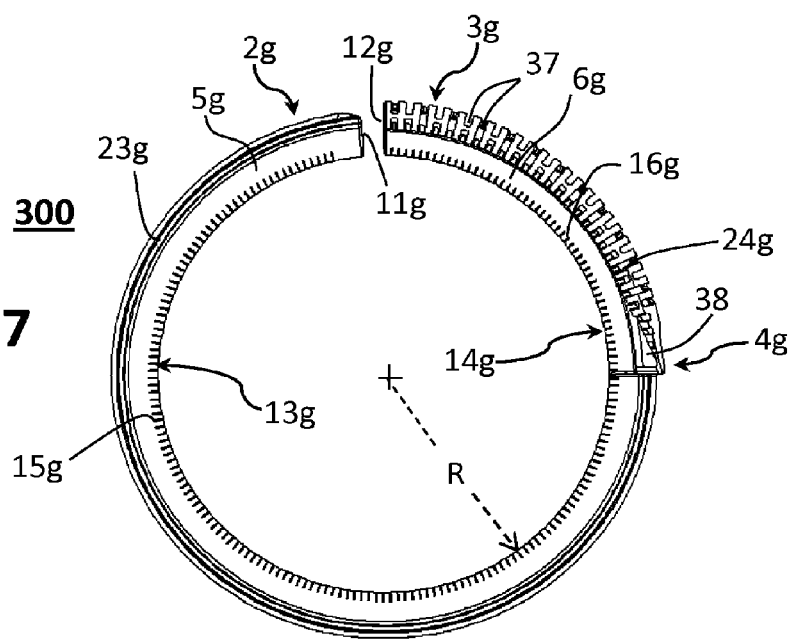
FIG. 7 is a top view of the tool illustrating an alternating pattern of cored-out material sections on the mating element of the female arm.
Figure 8A:
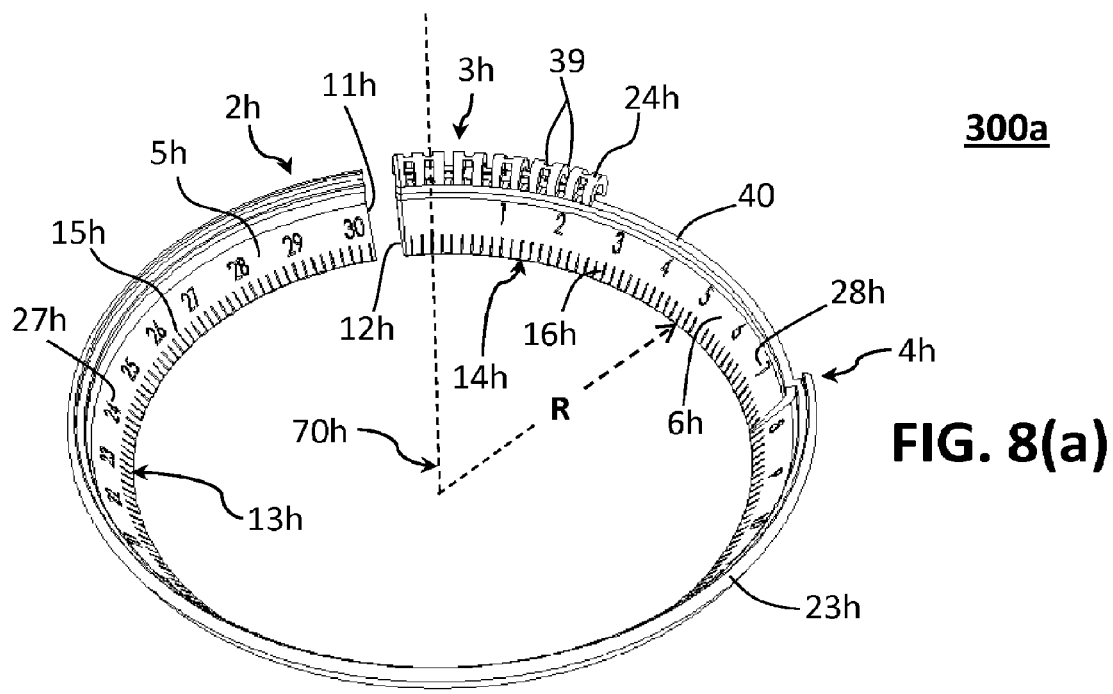
FIG. 8(a) is an isometric view of the tool, showing a preferred mode of construction, illustrating a reduced mating element on the female arm that is equivalent of a tangent guide feature and an alternating pattern of cored-out material sections on the mating element of the female arm.
Figure 8B:
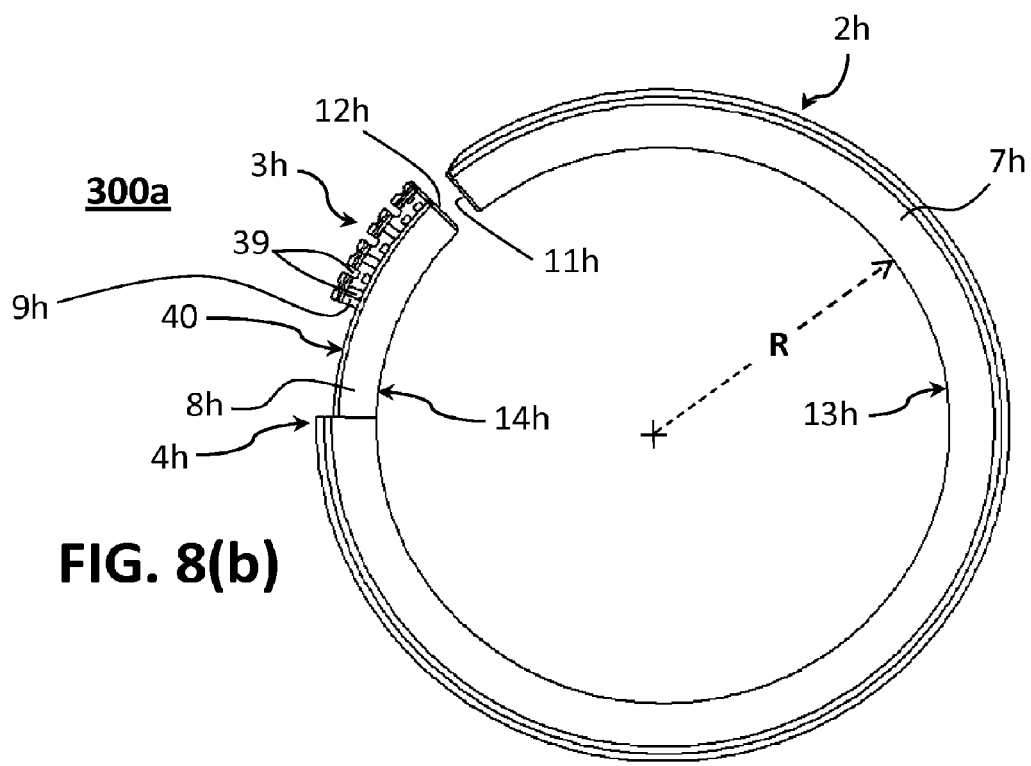
FIG. 8(b) is a bottom view of the tool shown in FIG. 8(a).
Figure 8C:
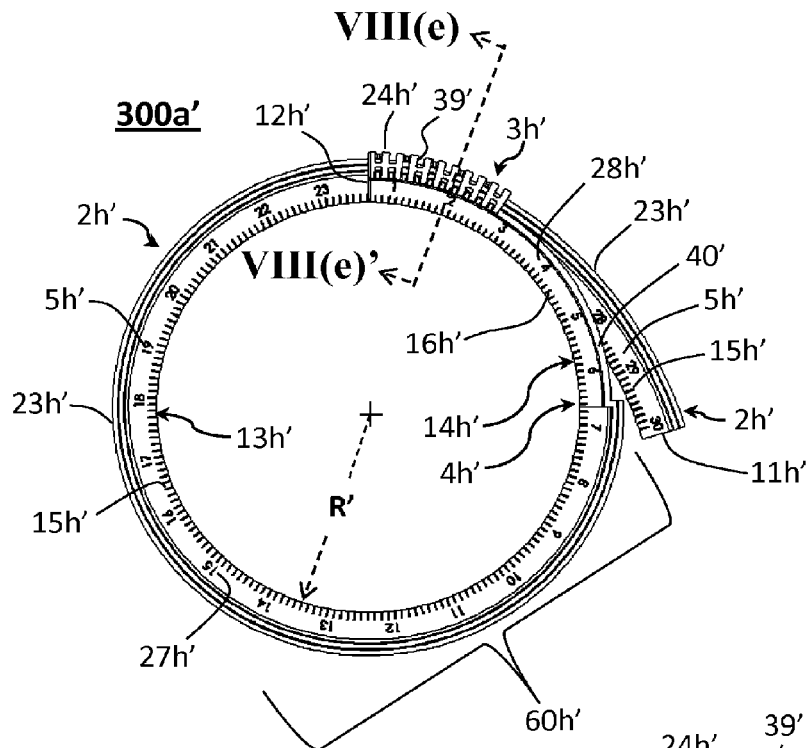
FIG. 8(c) is a top view of the tool shown in FIG. 8(a) illustrating the male and female arms slidably engaged to each other, thereby creating a loop of material, and the male arm extending past the female arm on a tangent path due to the simulated tangent guide feature on the female arm.
Figure 8E:
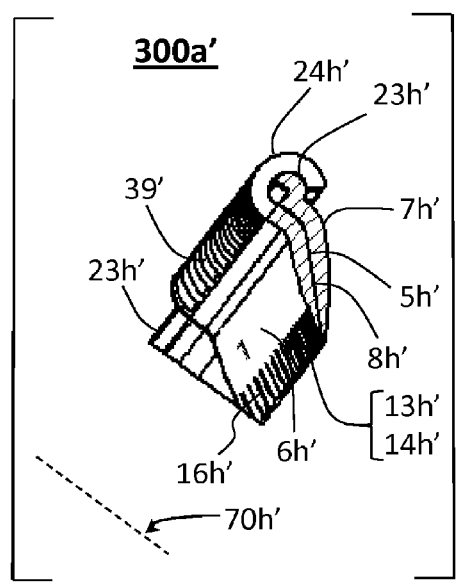
FIG. 8(e) is a cross-sectional view of the tool in shown in FIG. 8(c) taken from the VIII(e)-VIII(e)' cutting plane and illustrating that male- and female-arm cross-sectional profiles or shapes are slidably engage to each other such that the male and female arms are vertically stacked on each other and such that the radius at least along the inside surface or edge of each arm are exactly or approximately equal.
Figure 8D:
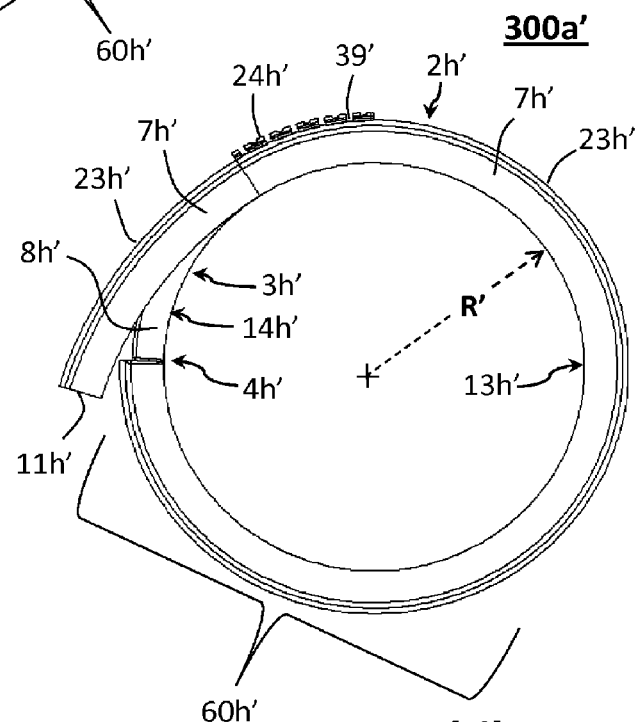
FIG. 8(d) is a bottom view of the tool shown in FIG. 8(c).

Additionally, referring to FIGS. 1(*a*)-11(*f*), the male 2 and female 3 arms of the tool 1 maybe oriented either clockwise (FIGS. 1(*a*)-1(*g*), FIGS. 3(*a*)-4(*b*), & FIGS. 6-11(*f*)) or counter-clockwise (FIG. 2 & FIGS. 5(*a*)-5(*b*)) with respect to the transitions section or zone 4 when viewed the perspective of the top or bottom view.

Referring to FIGS. 1(*a*)-11(*f*), the zero point 11, 12—the fixed point or edge or surface 11, 12 that acts as the starting reference for the measurement rule 15, 15*a*, 15*d*, 15*g*, 15*h*, 15*h*', 15*k*, 15*kk*, 16, 16*a*, 16*d*, 16*g*, 16*h*, 16*h*', 16*k*, 16*kk*, 27*h*, 27*h*', 28*h*, 28*h*', 33*k*, 33*kk*, 34*k*, 34*kk* (hereinafter 15, 16, 27, 28, 33 and 34, respectively) and is it is preferably located on either the terminal end 11 of male arm 2 or the terminal end 12 of the female arm 3.

Referring to FIGS. 1(*a*)-11(*f*), if the zero point 12, 11*k* is exclusively in reference to the ruler markings 15, 16, 27, 28 on the inside surface(s) 5, 5*a*, 5*d*, 5*f*, 5*g*, 5*h*, 5*h*', 5*i*, 5*j*, 5*k*, 6, 6*a*, 6*d*, 6*f*, 6*g*, 6*h*, 6*h*', 6*i*, 6*j*, 6*k*, 6*kk* (hereinafter 5 and 6, respectively) of the tool 1, it is preferably located on the terminal end 12, 11*k* of the arm 3 that is stacked on top of or that visually obstructs at least some portion of the inside surface(s) 5, 6*k*, 6*kk* of the other arm 2, 3*k*, when the said male and female arms are slidably engaged to each other and when the tool 1 is viewed from the top view.

Referring to FIGS. 1(*a*)-11(*f*), if the zero point 11, 12*k* is in reference to the ruler markings 33, 34 on the outside surface(s) 7, 7*b*, 7*c*, 7*d*, 7*h*, 7*h*', 7*j*, 7*k*, 8, 8*b*, 8*c*, 8*h*, 8*h*', 8*j*, 8*k*, 8*kk* (hereinafter 7 and 8, respectively) of the tool 1, it 11, 12*k* is preferably located on the terminal end 11, 12*k* of the arm 2, 3*k* that is stacked on top of or that visually obstructs at least some portion of the outside surface(s) 8, 8*b*, 8*c*, 8*h*, 8*h*', 8*j*, 7*k* of the other arm 3, 3*b*, 3*c*, 3*h*, 3*h*', 3*j*, 2*k* when the said male and female arms are slidably engaged to each other and when the tool 1 is viewed from the bottom view.

Referring to FIGS. 1(*a*)-11(*f*), the tool 1 preferably comprises rule markings 15, 16, 27, 28, 33, 34—which comprise line markings 15, 16, 33, 34 and numerical markings 27, 28—on either the inside 5, 6 or outside surface 7, 8 of the tool 1, or both, and wherein said line markings 15, 16, 33, 34 are preferably oriented parallel to the center axis 70 of the tool 1 and located near either the inner 13, 14 or outer 14*kk*, 13*kk* surfaces or edges of the tool 1, or both. Further, said numerical markings 27, 28 are preferably located farther from the edges or surfaces 13, 14 of the tool 1 than the line markings 15, 16, 33, 34.

Further, referring to FIGS. 1(*a*)-11(*f*), numerical and line markings 15, 16, 27, 28, 33, 34 together are preferably positioned at a specific length or arc length from the zero point 11, 12 such that they indeed indicate a measurement rule, either exactly or approximately, and including but not limited to the following: radius, diameter, arc length, circumference, sector area, area of circle, or any combination thereof, etc.

The measurement rule, referring to FIGS. 1(*a*)-11(*f*), may be either in empirical or metric system units, some other unit measurement system, etc.—either exclusively or in any combination thereof—on either the inside 5, 6 or outside 7, 8 surfaces of the tool 1, or both. Additionally, the measurement rule may be oriented either clockwise or counterclockwise with respect to the center axis 70 of the tool 1 when viewed from either the top or bottom view and on any surface 5, 5*a*, 5*d*, 5*f*, 5*g*, 5*h*, 5*h*', 5*i*, 5*j*, 6*k*, 6*kk*, 7, 8 of the tool 1.

Referring to FIGS. 1-11(*f*), either male arm 2 or female arm 3, or both, may contain locking features, e.g., the locking features 30, 31, 32 shown in FIGS. 3(*a*)-5(*b*), that are capable of non-permanently, either selectively or non-selectively, locking the position of the male and female arms 2, 3 with respect to each other, and thus, capable of locking the tool 1 at any particular size or radius, when the said male and female arms are slidably engaged to each other, as shown in FIGS. 8(*a*)-8(*c*).

If a selectively engageable locking mechanism is employed in the design, referring to FIGS. 1-11(*f*), then the male and female arms 2, 3 may comprise (i) a fastening or locking feature(s) of any type, including but not limited to a snap hook(s), interference material(s) 30, 31, 32, a clamp(s), a screw (thread force), a keyhole profile(s), a dowel(s), pin(s), a mechanical stop(s) of any sort, gear(s), a tooth or teeth, insert(s) and an insert groove(s), or any combination thereof, etc., and said fastening or locking feature(s) may be of any shape as long as the shape does not obstruct the tool's 1 intended functions as described herein. Alternatively, an independent part or assembly of parts capable of being secured to the tool 1 may be used for accomplishing the same. These locking features, parts, or assembly of parts preferably facilitate(s) or create(s) a locked state, whether by friction, force, material restriction, material interference, or any combination thereof, etc, that also allows the user to selectively disengage the lock so that the user can selectively adjust the tool's 1 size.

However, If a non-selectively engageable locking mechanism is employed in the design, referring to FIGS. 1-11(*f*), then either the male or female arms 2, 3 may comprise a fastening or locking feature(s), including but not limited to a snap hook(s), interference material(s) 30, 31, 32, a clamp(s), a screw (thread force), a keyhole profile(s), a dowel(s), pin(s), a mechanical stop(s) of any sort, gear(s), a tooth or teeth, insert(s) and an insert groove(s), or any combination thereof, etc., and said fastening or locking feature(s) may be of any shape as long as the shape does not obstruct the tool's 1 intended functions as described herein. Alternatively, an independent part or assembly of parts capable of being secured to the tool 1 may be used for accomplishing the same. These locking features, parts, or assembly of parts preferably facilitate(s) or create(s) a semi-locked state, whether by friction, force, material restriction, material interference, or some combination thereof, etc., that also allows the user to selectively adjust the tool's 1 size.

Generally referring to FIGS. 1-11(*f*), when the tool 1 is at rest, the male 2 and female 3 arms are preferably not slidably engaged or secured to each other. When the mating element 23, 24 on the free end 11 of the male arm 2 is inserted into the mating element 24*a*, 24*b*, 24*c*, 24*d*, 24*f*, 24*g*, 24*h*, 24*h*', 24*i*, 24*j*, 24*k* on the free end 12 of the female arm 3, or vice versa, the male and female arms 2, 3, are then slidably engaged to each other.

Generally referring to FIGS. 1-11(*f*), alternatively, an independent part or assembly of parts may be secured to either the male arm 2, female arm 3, or both, and contain a feature(s) or element(s) that allows said arms 2, 3 to slidably engage each other as described herein; thereby effectively performing the equivalent function of the mating elements 23, 24 as described herein.

Generally referring to FIGS. 1-11(*f*), once the arms 2, 3 are slidably engaged to each other, circles and arcs can be created by the surfaces or edges 13, 14. To create circles and arcs of a smaller size or radius (compared to any reference radius or size), slide the slidably engaged arms past each other such that the male arm 2, female arm 3, and the transition section 4 each undergo either an increasing degree of bending along the edges 13, 14; conversely, to create circles and arcs of a larger size or radius (compared to any reference radius or size) slide the slidably engaged arms past each other such that the male arm 2, female arm 3, and the transition section 4 each undergo an decreasing degree of bending along the edges 13, 14.

Referring to FIGS. 1(*a*)-11(*f*), the line 15, 16 and numerical 27, 28 markings can preferably be used as a guide to either select or measure a desired circle, arc, radius, diameter, circumference, arc-length, area-of-sector, and/or area-of-circle size, since together, these indicate markings 15, 16, 27, 28 the rule (e.g., radius, diameter, arc length, etc.) in a particular unit measurement system (e.g., metric, empirical, etc.), and the lock or locking mechanism 30, 31, 32 (FIGS. 3(*a*)-5(*b*)) preferably holds the created tool configuration or user-selected size of the tool 1 in a semi-locked and selectively-adjustable state.

Referring to FIGS. 1(*a*)-11(*f*), the tool 1 may be manufactured with or constructed with any of a wide-range of different materials, though preferably, but not necessarily, of one type—at least for the preferred embodiment—and may include, but is not limited to the following materials: polymers, co-polymers, or polymer alloys, such as preferably thermoplastic elastomers (TPE's) (e.g., styrenic block copolymers, polyolefin blends, elastomeric alloys (TPE-v or TPV), thermoplastic polyurethanes, thermoplastic co-polyester and thermoplastic polyamides, etc.), thermoplastic vulcanizates (TPV's), thermoplastics, thermoset plastics, etc., or metal and metal alloys, such as, aluminum (e.g., aluminum 1100-H14, 3003-H14, 5052-H32, 6061-T6, and others, etc.), brass, copper, cobalt, gold, nickel, platinum, silver, steel, stainless steels &/or stainless steel alloys (e.g., stainless steel 304, stainless steel 316, and stainless steel 410, and others, etc.), tin, titanium, alloys of these materials, combinations of the aforesaid, etc., and of any other type of polymer, polymer alloy, metal, or metal alloy (e.g., sheet metals would be preferable, should metals and/or metal alloys be used) used in the construction of mechanical parts.

Further, referring to FIGS. 1(*a*)-11(*f*), the tool 1 may be used in conjunction with an actuator that is securely fastened to at least one of the arms 2, 3 and wherein said actuators is capable of adjusting the relative positions of the arms 2, 3 with respect to each other such that tool 1 is capable of perform its intended functions as described herein. The actuator can be controlled either manually or remotely for the purpose of automating the tool's 1 functions and use.

Referring to FIGS. 1(a)-11(f), the tool 1 may be used for, but not limited to the following applications: sketching and drafting in conjunction with a writing instrument (e.g., pencils, pens, markers, etc.) on various types of surfaces (e.g., paper, wood, drywall, etc), for measuring circular shapes (e.g., shaft thickness, hole diameter, radii, arc length, circumference, etc.), for positioning objects (patterning picture frames, or spacing a cut on drywall, etc.), shape-cutting in conjunction with a cutting tool (e.g., scrapbooking, cutting select size circles in wood or dry wall for ceiling lights, etc.), etc.

Second Embodiment

In a second embodiment, an assembly of parts functionally equivalent to the tool 1 shown in FIGS. 1-11(f) comprises of at least: (ii) two parts—an independent part comprising the functional equivalent of one of the arms 2, 3 and the transition section 4 and the other part comprising of the functional equivalent of the other either male or female 2, 3; or (ii) 3 parts—a part comprising the functional equivalent of the male arm 2, a part comprising the functional equivalent of the female arm 3, and a part comprising the functional equivalent of the transitions section 4. Wherein each of the said parts comprise mechanical fastening features that are capable of cooperating with each other such that these features securably engage each other for the purpose of forming an assembly of parts functionally equivalent to the tool 1 shown in FIGS. 1-11(f). Each of the parts may be made of a different or the same material, such as those described herein, in order to achieve either the same or approximately the same or different bending properties for each of the equivalent sections 2, 3, 4.

Additionally, said tool that is functionally equivalent to the tool 1 shown in FIGS. 1(a)-11(f), may contain one or more features or elements, independent parts, or assembly of parts capable of being secured to any section 2, 3 of the tool and that are functionally equivalent to and capable of performing the same function as any or all of features or elements previously described for the tool 1 shown in FIGS. 1(a)-11(f) as described herein. Said tool may additionally contain any modifications or enhancements as those described herein for the tool 1 shown in FIGS. 1(a)-11(f), its arms 2, 3, and transitions section 4.

Further, referring to FIGS. 1(a)-11(f), said functionally equivalent tool 1 may be used in conjunction with an actuator that is securely fastened to at least one of the arms 2, 3 and wherein said actuators is capable of adjusting the relative positions of the arms 2, 3 with respect to each other such that said functionally equivalent tool is capable of perform its intended functions as described herein. The actuator can be controlled either manually or remotely for the purpose of automating the tool's 1 functions and use.

We claim:

1. A device for creating curved shapes having a flexible ring-like body comprised of at least one part with at least a first arm, second arm, and transition section,
    a. wherein said transition section is located between said first and second arms, and
    b. wherein said first and second arms are slidably secured to each other by means of a mechanical fastener, and
    c. wherein one of the said arms is stacked on the other such that at least the inner or outer edges of said arms follow the same curvature when viewed from either the top of or bottom view of the device when said arms are slidably engaged, each of said arms having an inner circumferential edge and the inner circumferential edges of said arms are overlapping and coincident, and wherein a cross-sectional profiles of said first arm, second arm, and transition section comprise cut-out material sections patterned around a sweep profile or shape of the device for improving the bendability of the device.

2. A device for creating curved shapes having a flexible ring-like body and comprised of at least two parts,
    a. wherein said first part comprises a first arm and a transitions section and said second part comprises at least a second arm
    b. wherein said first and second parts comprise mechanical fastening features capable of securing said first and second part to each other such that said transition section is preferrably located between said first and second arms, and
    c. wherein said first and second arms are slidably secured to each other by means of a mechanical fastener, and
    d. wherein one of the said arms is stacked on the other such that at least the inner or outer edges of said arms follow the same curvature when viewed from either the top or bottom view of the device when said arms are slidably engaged, each of said arms having an inner circumferential edge and the inner circumferential edges of said arms are overlapping and coincident, and wherein a cross-sectional profiles of said first arm, second arm, and transition section comprise cut-out material sections patterned around a sweep profile or shape of the device for improving the bendability of the device.

3. A device for creating curved shapes having a flexible ring-like body and comprised of at least three parts,
    a. wherein a first part comprises a first arm, a second part comprises a second arm, and a third part comprises a transitions, and
    b. wherein said first, second, and third parts comprise mechanical fastening features capable of securing said first, second, and third parts to each other such that said transition section is preferably located between said first and second arms, and
    c. wherein said first and second arms are slidably secured to each other by means of a mechanical fastener, and
    d. wherein one of the said arms is stacked on the other such that at least the inner or outer edges of said arms follow the same curvature when viewed from either the top or bottom view of the device when said arms are slidably engaged, each of said arms having an inner circumferential edge and the inner circumferential edges of said arms are overlapping and coincident, and wherein a cross-sectional profiles of said first arm, second arm, and transition section comprise cut-out material sections patterned around a sweep profile or shape of the device for improving the bendability of the device.

4. A device as in one of claims 1 through 3, wherein said mechanical fastening features for slidably securing said first arm to said second arm are located on either the said first arm, second arm, or both.

5. A device according to claim 2, wherein said mechanical fastening features for slidably securing said first part to said second part is an independent part, parts, or assembly of parts capable of being secured to the said device.

6. A device according to claim 3, wherein said mechanical fastening features capable of fastening the said first part to the said second part and the said second part to the said third part are located on either the said first, second, or said third part, or any combination thereof.

7. A device as in one of claims 1 through 3, wherein said first arm, second arm, and transitions sections comprise measurement rule markings on either the inside or outside surface of the device, or both.

8. A device as in one of claims 1 through 3, wherein the rule markings include at least one of: or radius, diameter, circumference, arc length, circular area, and or sector area, or combination thereof.

9. A device as in one of claims 1 through 3, wherein said first arm, second arm, and transitions section is made of one material type permeably taken from, but not limited to the following: polymers, co-polymers, or polymer alloys-including thermoplastic elastomers (TPE's) (including styrenic block copolymers, polyolefin blends, elastomeric alloys (TPE-v or TPV), thermoplastic polyurethanes, thermoplastic co-polyester and thermoplastic polyamides), thermoplastic vulcanizates (TPV's), thermoplastics, thermoset plastics, or metal and metal alloys, including aluminum (including aluminum 1100-H14, 3003-H14, 5052-H32, 6061-T6), brass, copper, cobalt, gold, nickel, platinum, silver, steel, stainless steels &/or stainless steel alloys (including stainless steel 304, stainless steel 316, and stainless steel 410), tin, titanium, alloys of these materials, combinations of the aforesaid, and of any other type of polymer, polymer alloy, metal, or metal alloy (including sheet metals should metals and/or metal alloys be used).

10. A device as in one of claims 1 through 3, wherein said first arm, second arm, and transitions section is made of one material type permeably taken from, but not limited to the following: polymers, co-polymers, or polymer alloys-including thermoplastic elastomers (TPE's) (including styrenic block copolymers, polyolefin blends, elastomeric alloys (TPE-v or TPV), thermoplastic polyurethanes, thermoplastic co-polyester and thermoplastic polyamides), thermoplastic vulcanizates (TPV's), thermoplastics, thermoset plastics, or metal and metal alloys, including aluminum (including aluminum 1100-H14, 3003-H14, 5052-H32, 6061-T6), brass, copper, cobalt, gold, nickel, platinum, silver, steel, stainless steels &/or stainless steel alloys (including stainless steel 304, stainless steel 316, and stainless steel 410), tin, titanium, alloys of these materials, combinations of the aforesaid, and of any other type of polymer, polymer alloy, metal, or metal alloy (including sheet metals should metals and/or metal alloys be used.

11. A device as in one of claims 1 through 3, wherein said first arm, second arm, and transitions section have the same flexibility, thereby allowing for the creation of a concentric single-radius shapes.

12. A device as in one of claims 1 through 3, wherein the said first and second arms have the same flexibility and separated by a long transition section separating the center axis of each of the said arms and allowing for creation of ellipses.

13. A device as in one of claims 1 through 3, wherein said first arm is flexible and said second arm is less flexible, thereby allowing for the creation of a curved shape non-concentric and/or poly-radius shapes.

14. A device as in one of claims 1 through 3, wherein said first arm is flexible and said second arm is rigid, thereby allowing for the creation of a curved shape non-concentric curves emanating from straight edge.

15. A device as in one of claims 1 through 3, wherein one of the said arms is flexible and the other is rigid, thereby allowing for the creation of a curved shape following the inner or outer edge of the at least flexible arm and a linear shape following the inner or outer edge of the at least rigid arm, wherein the said curved shape intersects said linear shape at least one point.

16. A device as in one of claims 1 through 3, further comprising at least a feature on at least one or both of the arms or at least a part or assembly of parts capable of being secured to the arms, the feature is capable of selectively non-permanently locking the slidable position of the arms of the device at any relative position.

17. A device as in one of claims 1 through 3, said device further comprising at least a feature on at least one or both of the arms or at least a part or assembly of parts capable of being secured to the arms, the feature is capable of non-selectively non-permanently locking the slidable position of the arms of the device at any relative position.

18. A device as in one of claims 1 through 3, wherein said first and second arms each comprise a lengthwise slot running along each arm.

19. A device as in one of claims 1 through 3, each arm has cross-sectional profile of any shape but have equal and coincident curvatures (co-curvature) inside and outside surfaces or edges when arms are slidably engaged.

20. A device as in one of claims 1 through 3, wherein said device comprises a tangent guide feature or features that divert material away from the material loop when said first arm is slidably engaged to said second arm.

21. A device as in one of claims 1 through 3, wherein said features or elements for slidably engaging said first arm to said second arm comprise cored-out material sections.

* * * * *